US009545905B2

(12) United States Patent
Ohnishi et al.

(10) Patent No.: US 9,545,905 B2
(45) Date of Patent: Jan. 17, 2017

(54) ELECTRIC BRAKE DEVICE

(75) Inventors: Takaaki Ohnishi, Saitama (JP);
Kazuaki Murayama, Saitama (JP);
Hiroshi Nakano, Saitama (JP);
Kazuyoshi Akutsu, Saitama (JP);
Hideo Miyabayashi, Nagano (JP);
Yoshiyuki Takamatsu, Nagano (JP);
Nobuyuki Kobayashi, Nagano (JP);
Motoyasu Nakamura, Nagano (JP);
Yoshiteru Matsunaga, Nagano (JP)

(73) Assignees: Honda Motor Co., Ltd., Tokyo (JP);
Autoliv Nissin Brake Systems Japan Co., Ltd., Nagano (JP)

( * ) Notice: Subject to any disclaimer, the term of this patent is extended or adjusted under 35 U.S.C. 154(b) by 542 days.

(21) Appl. No.: 14/007,716

(22) PCT Filed: Mar. 27, 2012

(86) PCT No.: PCT/JP2012/058006
§ 371 (c)(1),
(2), (4) Date: Sep. 26, 2013

(87) PCT Pub. No.: WO2012/133456
PCT Pub. Date: Oct. 4, 2012

(65) Prior Publication Data
US 2014/0026557 A1     Jan. 30, 2014

(30) Foreign Application Priority Data

Mar. 31, 2011   (JP) .................................. 2011-079165
Mar. 31, 2011   (JP) .................................. 2011-080014
Mar. 31, 2011   (JP) .................................. 2011-080257

(51) Int. Cl.
*B60T 13/74*     (2006.01)
*F15B 15/24*     (2006.01)
(Continued)

(52) U.S. Cl.
CPC ............ *B60T 13/745* (2013.01); *B60T 8/4081* (2013.01); *B60T 11/232* (2013.01); *B60T 13/146* (2013.01); *F15B 15/24* (2013.01)

(58) Field of Classification Search
CPC ..... B60T 8/4081; B60T 11/232; B60T 11/228; B60T 13/146; B60T 13/745; F15B 15/24; F15B 7/08; F15B 7/10
See application file for complete search history.

(56) References Cited

U.S. PATENT DOCUMENTS

| 5,449,225 A | * | 9/1995 | Burgdorf | .................. B60T 8/38 137/614.19 |
| 7,651,176 B2 | * | 1/2010 | Inoue | .................... B60T 8/4081 303/114.1 |
| 2004/0239176 A1 | * | 12/2004 | Beccafico | ................. B60T 8/38 303/115.1 |

FOREIGN PATENT DOCUMENTS

CN     201493385 U     6/2010
DE     10255198 A1     7/2003
(Continued)

OTHER PUBLICATIONS

Extended European Search Report dispatched from the European Patent Office on Dec. 23, 2014 with respect to corresponding to European Application No. 12765025.7.
(Continued)

*Primary Examiner* — Logan Kraft
(74) *Attorney, Agent, or Firm* — Carrier Blackman & Associates, P.C.; Joseph P. Carrier; Jeffrey T. Gedeon

(57) ABSTRACT

An electric brake device includes a first slave piston which is housed in a cylinder body and generates hydraulic pressure in a first hydraulic chamber by moving forward, a motor which transmits a driving force to the first slave piston, and a restriction pin which is inserted and secured to the cylinder body in a direction perpendicular to an axial direction of the
(Continued)

cylinder body and restricts a backward position of the first slave piston when a hydraulic pressure is applied from an outside to the first hydraulic chamber, wherein the restriction pin is inserted and secured to the cylinder mechanism in the direction perpendicular to the axial direction of the cylinder main body. Further, a clearance is formed between an inner peripheral wall of the cylinder body and a first groove portion and second groove portion which are formed on an outer surface of the restriction pin.

15 Claims, 19 Drawing Sheets

(51) Int. Cl.
  *B60T 8/40* (2006.01)
  *B60T 13/14* (2006.01)
  *B60T 11/232* (2006.01)

(56) References Cited

FOREIGN PATENT DOCUMENTS

| JP | 2001-138887 A | 5/2001 |
| JP | 2008-143419 A | 6/2008 |
| JP | 2010-023594 A | 2/2010 |
| JP | 2010-047216 A | 3/2010 |

OTHER PUBLICATIONS

Office Action dispatched on Dec. 4, 2015 with respect to corresponding Chinese application No. 201280015102.X with English translation thereof.

* cited by examiner

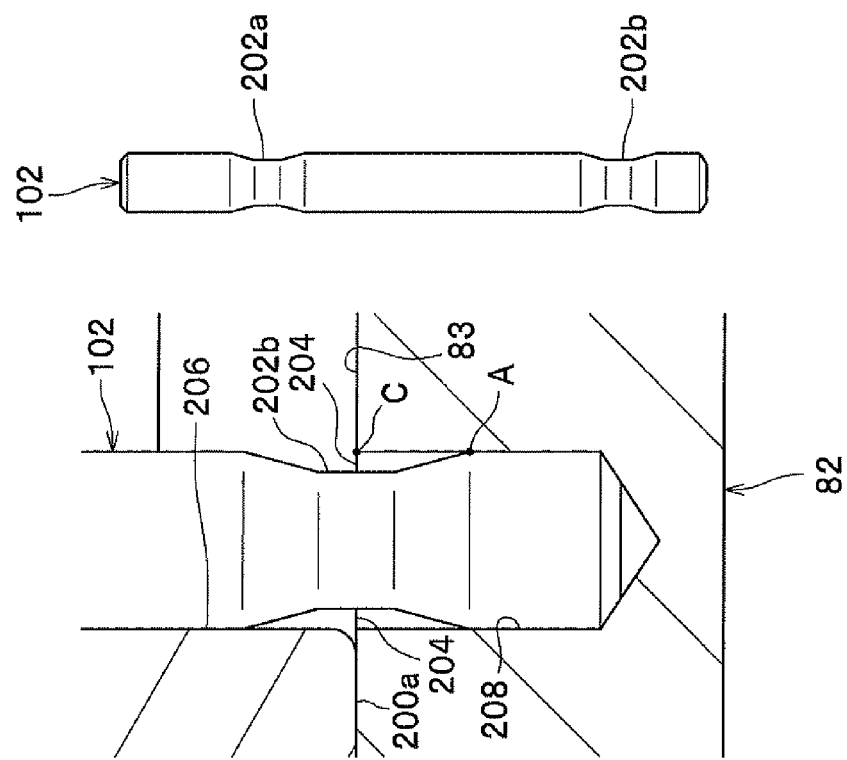
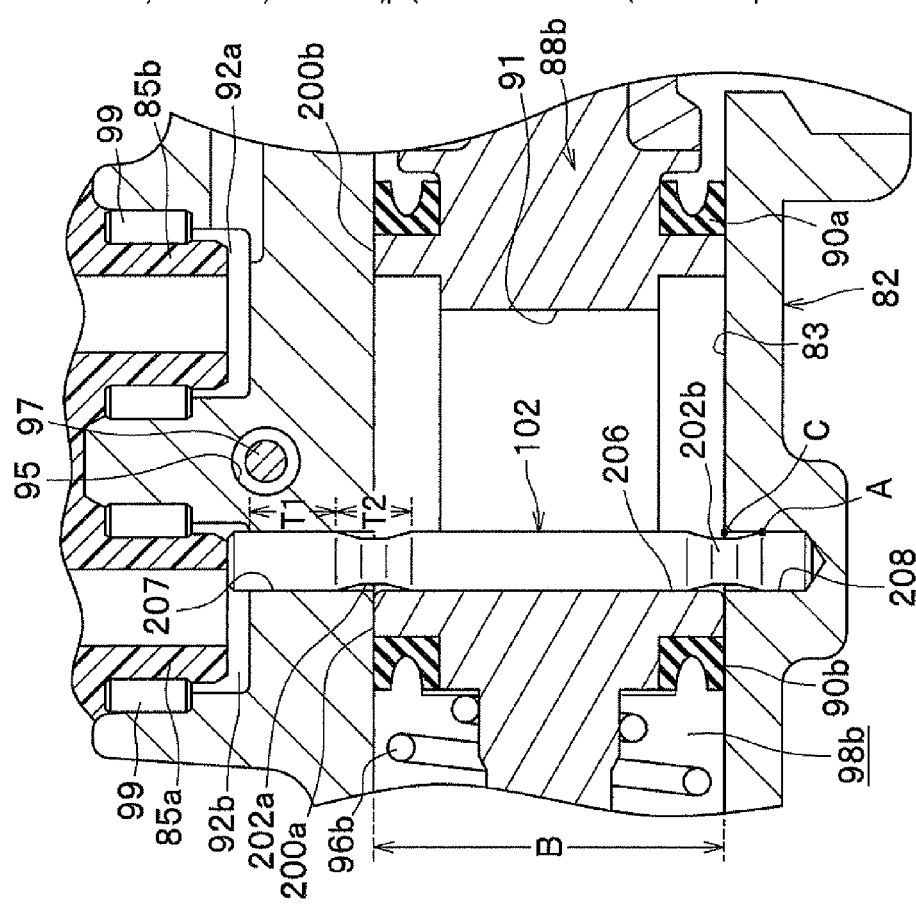

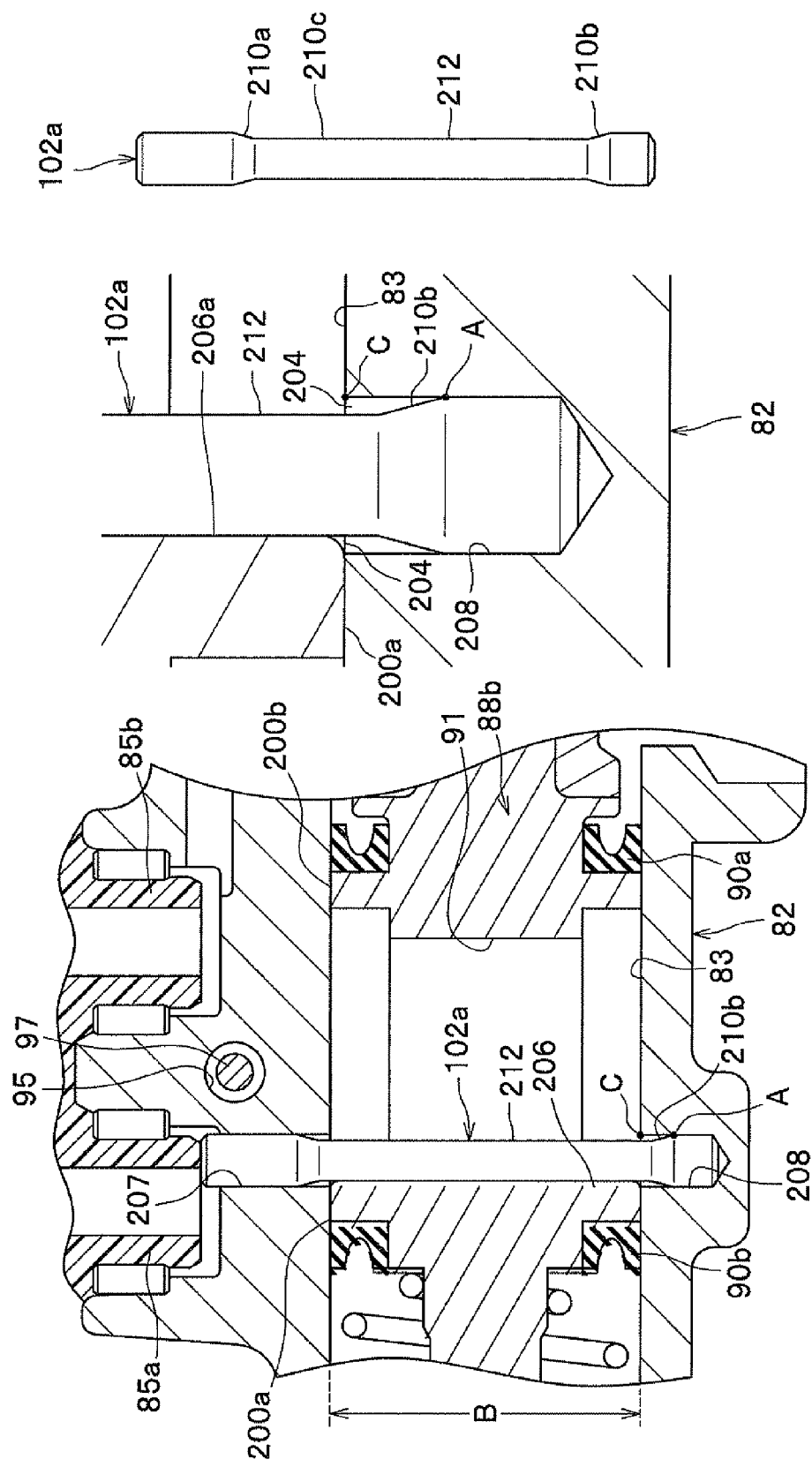

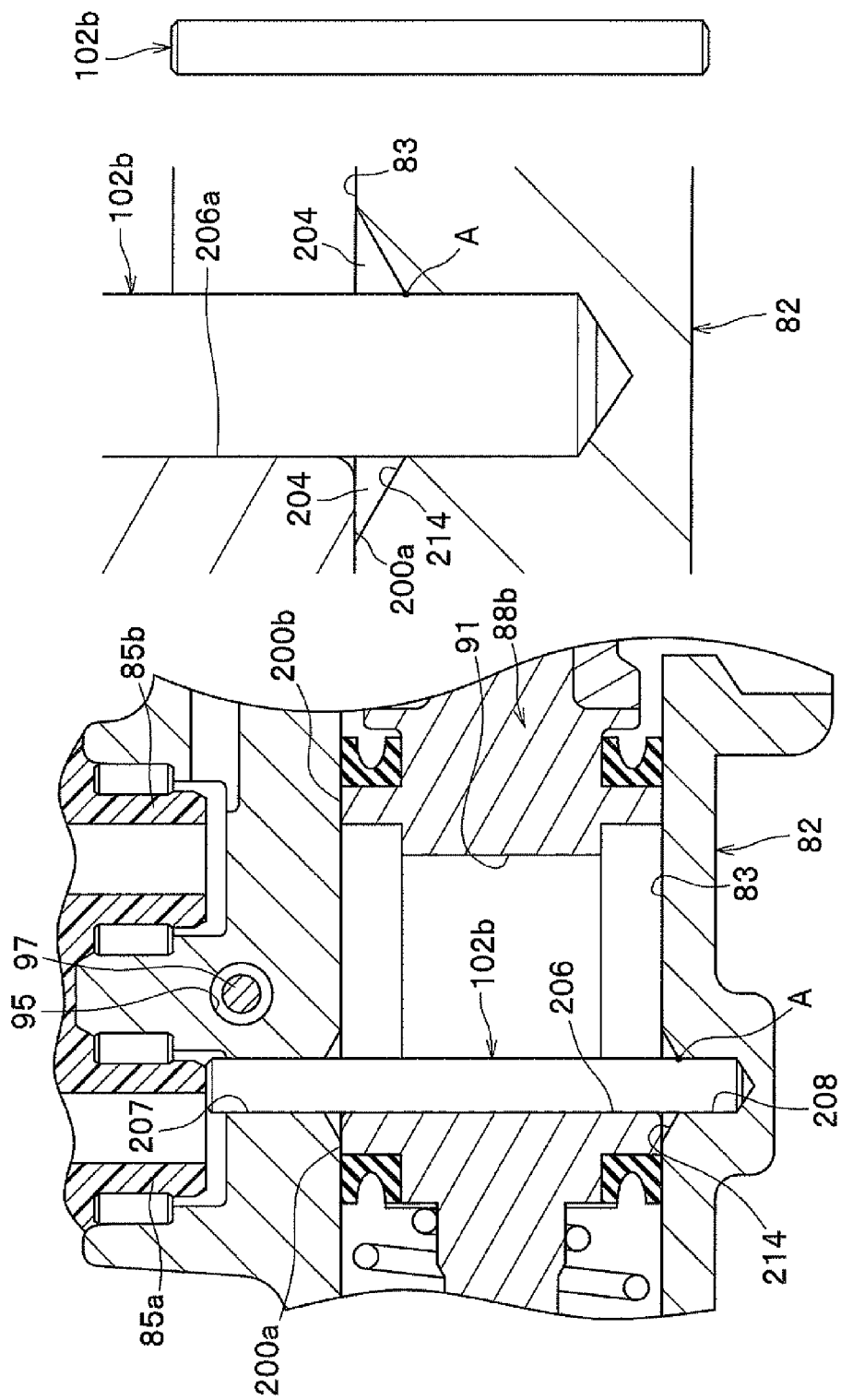

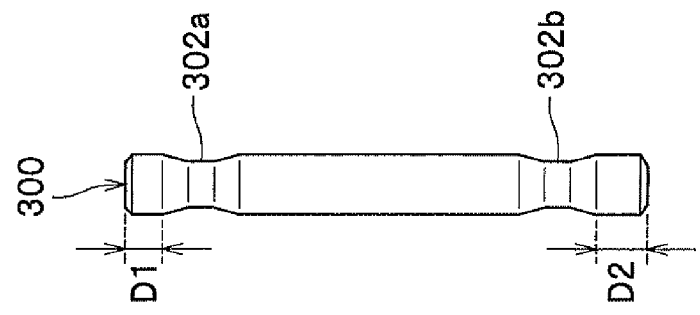
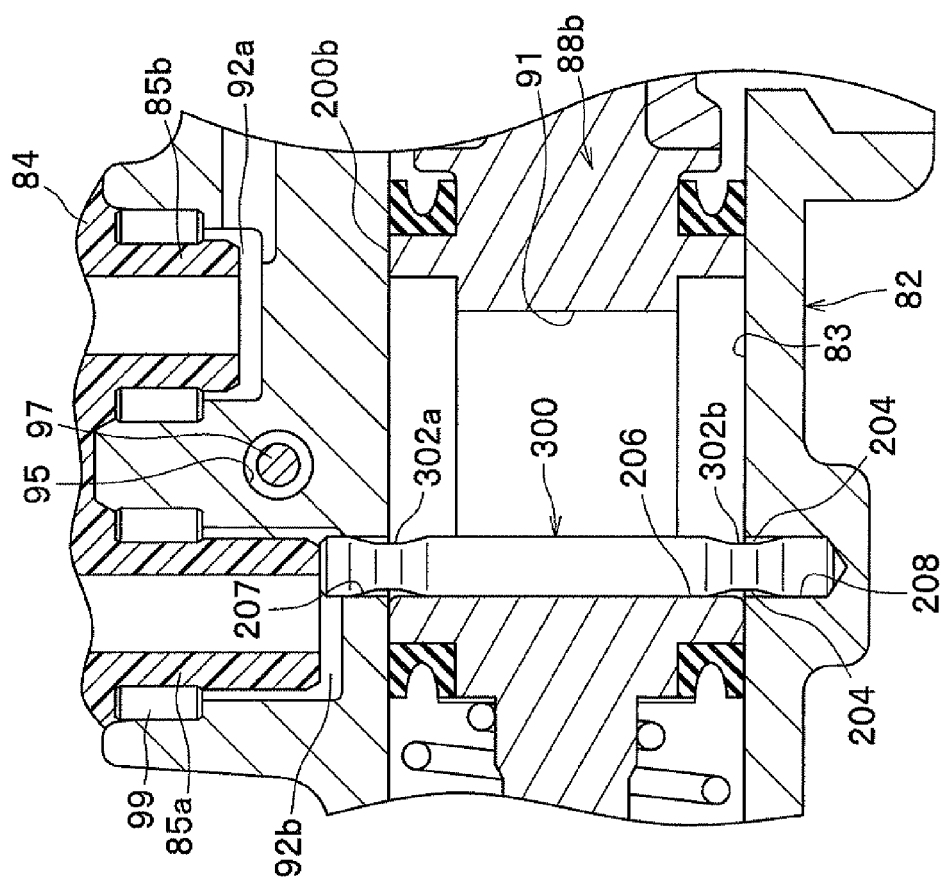

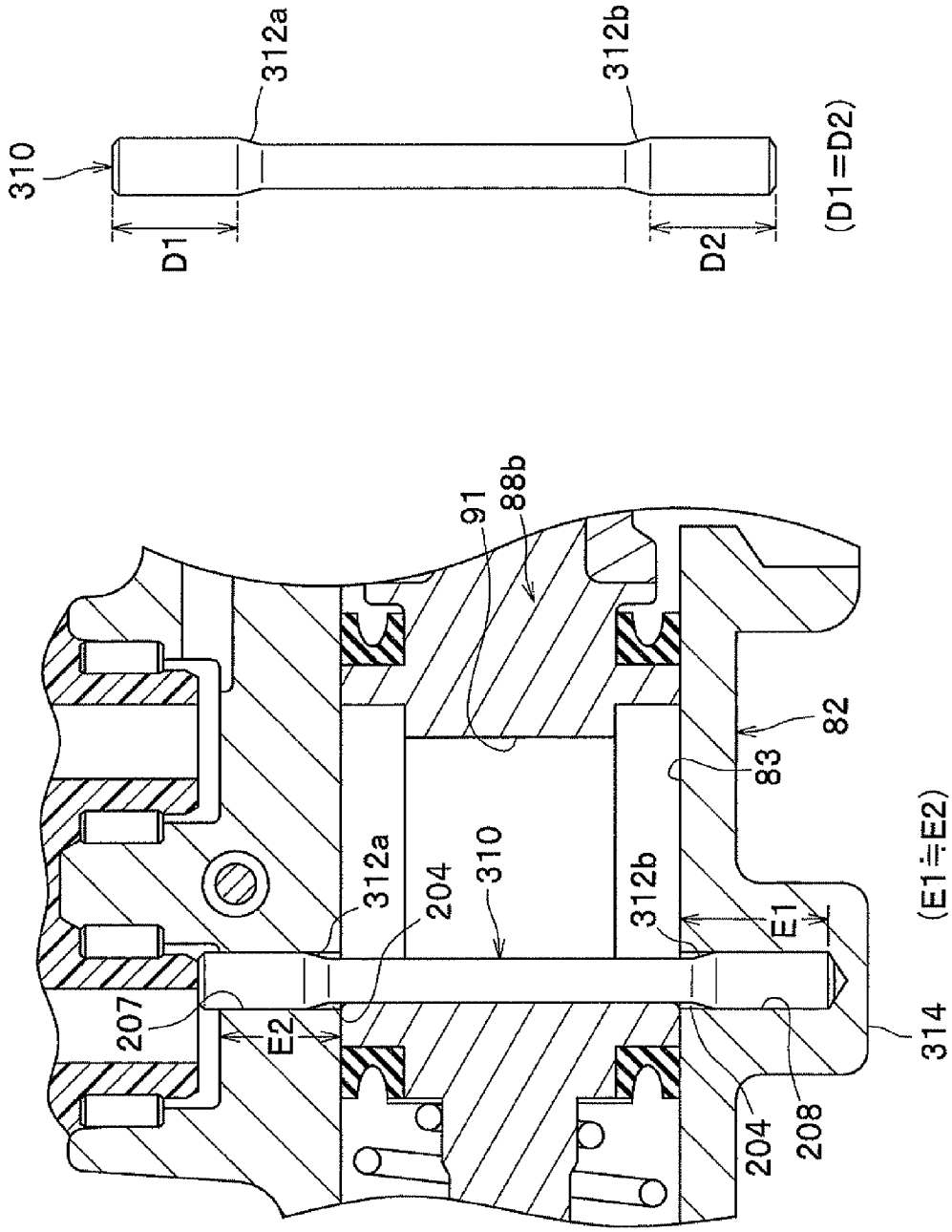

ELECTRIC BRAKE DEVICE

CROSS REFERENCE TO RELATED APPLICATIONS

This application claims the foreign priority benefit under Title 35, United States Code, 119 (a)-(d) of Japanese Patent Applications No. 2011-080014, No. 2011-080257, No. 2011-079165, filed on Mar. 31, 2011 in the Japan Patent Office, the disclosure of which is herein incorporated by reference in its entirety.

TECHNICAL FIELD

The present invention relates to an electric brake device incorporated in, for example, a vehicle brake system.

BACKGROUND ART

Conventionally, as a brake mechanism for a vehicle, there has been known a booster, for example, with use of a hydraulic booster or a negative pressure booster. In recent years, as a booster of this type, there has been disclosed an electric booster with use of an electric motor as a boosting source (refer to, for example, Patent Document 1).

The electric booster disclosed in Patent Document 1 is configured as an integrated single device including a main piston (input piston) which is reciprocated by an operation of a brake pedal, a cylindrical booster piston which is fitted onto the main piston so as to be displaceable relative to the main piston, and an electric motor which reciprocates the booster piston.

In this case, the electric booster has the main piston and the booster piston as pistons of a master cylinder and has each of front end portions of the pistons facing each pressure chamber of the master cylinder, and generates a brake hydraulic pressure in the master cylinder, by an input thrust force applied to the main piston from the brake pedal and by a booster thrust force applied to the booster piston from the electric motor.

Incidentally, in the electric booster disclosed in Patent Document 1, for example, when a hydraulic pressure is applied from an outside to the pressure chamber which is faced by the main piston of the master cylinder, the main piston moves backward to the booster piston side by an operation of the hydraulic pressure, but it becomes difficult to ensure a minimum hydraulic pressure in the master cylinder if the main piston moves backward too much. In this case, a backward movement of the main piston can be, for example, restricted by a restriction unit or the like, but there is a possibility that a piston sliding surface of the cylinder body is deformed by a load which is applied to the restriction unit and transmitted to the cylinder body.

Further, in the electric booster disclosed in Patent Document 1, for example, when a pressure is applied from the outside to the pressure chamber which is faced by the main piston of the master cylinder, a restriction unit which restricts a backward position of the main piston is required in order to ensure a minimum brake hydraulic pressure in the master cylinder. However, in this case, there is a concern that an excessive force is applied to the restriction unit.

Meanwhile, there has been known a vehicle brake device including a master cylinder into which a brake operation of an operator is inputted, and a slave cylinder as an electric brake device which generates the brake hydraulic pressure based on an electrical signal in accordance with the brake operation (for example, see Patent Document 2).

In the slave cylinder of the vehicle brake device, when the motor is driven, the piston moves forward via a gear mechanism, and a ball screw mechanism having a nut and a screw which is engaged with the nut. That is, the nut receives a rotational driving force of the motor, and the screw engaged with the nut moves in the axial direction to press the piston, and thus the piston is moved forward. Thus, the brake hydraulic pressure is generated in a hydraulic chamber which is formed in front of the piston, and the brake hydraulic pressure is outputted to the fluid passage through a port.

However, in the slave cylinder, the screw moves in the axial direction by a rotation of the nut during a forward movement of the piston, and a decentering (shake; deviation from the reference center position of the axis) of the screw tip increases in response to an increase of a projection amount of the screw from the nut, and thus there is a possibility that an inclination of the piston pressed by the screw occurs. Such inclination of the piston leads to a damage or abrasion of the piston, a seal member attached to the piston, or the like.

CITATION LIST

Patent Literature

{Patent Document 1}
Japanese Patent Application Publication No. 2010-023594
{Patent Document 2}
Japanese Patent Application Publication No. 2008-143419

SUMMARY OF INVENTION

Technical Problem

The present invention has been made in order to solve at least one of the problems mentioned above. The object of the present embodiment is to provide an electric brake device capable of preventing a deformation of the piston sliding surface of the cylinder body by suppressing a transmission of a load from the restriction pin to the cylinder body, when a displacement of the piston is restricted by a restriction pin.

Solution to Problem

To achieve the above object, the present invention is characterized in that an electric brake device includes an output hydraulic pressure chamber connected to a wheel cylinder, a piston that generates a hydraulic pressure in the output hydraulic pressure chamber by moving forward, a cylinder that accommodates the piston in a cylinder body, a motor that drives the piston forward by transmitting a driving force thereof to the piston, and a restriction unit that restricts a backward movement of the piston when a hydraulic pressure is applied from an outside to the output hydraulic pressure chamber, wherein the restriction unit is composed of a restriction pin that is inserted and secured to the cylinder in a direction perpendicular to an axial direction of the cylinder body.

According to the present invention, when a displacement of the piston is restricted by the restriction pin, it is possible to prevent a deformation of a piston sliding surface of the cylinder body by suppressing a transmission of a load from the restriction pin to the cylinder body.

Further, the present invention is characterized in that a clearance is formed between an inner peripheral wall of the cylinder body and an outer surface of the restriction pin.

According to the present invention, by providing the clearance which separates the outer surface of the restriction pin from the inner peripheral wall of the cylinder body, it is possible to separate a load transmission point transmitting the load from the restriction pin to the cylinder body radially outward from an effective inner diameter of the cylinder body, thereby suppressing the deformation of the inner peripheral wall of the cylinder body. As a result, in the present invention, it is possible to ensure a desired sliding performance on the inner peripheral wall (piston sliding surface) of the cylinder body.

Further, the present invention is characterized in that the restriction pin is inserted and secured to the cylinder body.

According to the present invention, by the restriction pin being inserted and secured to the cylinder body, it is possible to support a load applied to the restriction pin separately at two points.

Further, the present invention is characterized in that an axial length of a support portion of the restriction pin supported by the cylinder body is set longer than an axial length of the clearance in an insertion direction of the restriction pin.

According to the present invention, by setting the axial length of the support portion of the restriction pin supported by the cylinder body longer than the axial length of the clearance, it is possible to ensure desired support strength of the restriction pin.

Furthermore, the present invention is characterized in that the cylinder body which supports the restriction pin is partially formed with an enlarged diameter portion of the inner peripheral wall thereof, and the clearance is formed between the enlarged diameter portion and the outer surface of the restriction pin.

According to the present invention, by forming the enlarged diameter portion on the inner peripheral wall of the cylinder body, it is not necessary to machine the restriction pin, thereby reducing a manufacturing cost.

Furthermore, the present invention is characterized in that the restriction pin is partially formed with a reduced diameter portion thereof in a portion corresponding to the inner peripheral wall of the cylinder body, and the clearance is formed between the reduced diameter portion and the inner peripheral wall of the cylinder body.

According to the present invention, by forming the reduced diameter portion on the outer surface of the restriction pin, it is not necessary to machine the inner peripheral wall of the cylinder body, thereby reducing a manufacturing cost. In addition, the reduced diameter portion is preferably formed with, for example, a groove, a taper, a recess of entire reduced diameter, or a composite shape thereof.

Furthermore, the present invention is characterized in that shapes of one end side and the other end side in the axial direction of the restriction pin are formed symmetrically.

According to the present invention, by symmetrical shapes of one end and the other end of the restriction pin, it is possible to eliminate directionality when assembling it to the cylinder body, thereby preventing an assembly error.

Furthermore, the present invention is characterized in that the electric brake device includes a restriction portion that restricts an abutment between the piston and the central portion of the restriction pin.

According to the present invention, by providing the restriction portion, it is possible to suppress a bending moment applied to the restriction pin.

Furthermore, the present invention is characterized in that the electric brake device includes a holding member that holds a head portion of the restriction pin.

According to the present invention, by providing the holding member for the restriction pin, it is possible to perform a position restriction and preventing slipping out of the restriction pin reliably.

Furthermore, the present invention is characterized in that the piston is partially formed with an abutting portion against the restriction pin on an outer peripheral side thereof.

According to the present invention, by providing the abutting portion which abuts against the restriction pin on the outer peripheral side of the piston, it is possible to increase an area of an abutting surface which the restriction pin abuts against, thereby suppressing the bending moment for the restriction pin. As a result, in the present invention, it is possible not only to prevent a deformation of the restriction pin but also to avoid the deformation of the cylinder body which locks the restriction pin.

In addition, according to the present invention, since the bending moment for the restriction pin is suppressed, it is possible to suppress a twisting effect and inclination effect of the piston which is displaced sliding in the cylinder body.

Furthermore, the present invention is characterized in that the abutting portion is formed on a rear surface of a flange portion supporting an elastic member which urges the piston toward a backward direction.

According to the present invention, since the abutting portion is formed on the rear surface of the flange portion supporting the elastic member which urges the piston toward the backward direction, it is possible to suppress a load applied via the elastic member from being applied to the rotation direction of the piston.

Furthermore, the present invention is characterized in that the abutting portion is composed of a groove portion formed on the rear surface of the flange portion in a direction perpendicular to an axial direction of the piston.

According to the present invention, since the abutting portion is composed of the groove portion, it is possible to decrease a load by reducing a surface pressure when the groove portion abuts against the restriction pin by abutting against the restriction pin in a state of surface contact.

Furthermore, the present invention is characterized in that the electric brake device includes a driving force transmission mechanism for transmitting the driving force of the motor to the piston, wherein an annular guide portion that guides the piston movably in the axial direction of the piston is disposed so as to face the outer peripheral surface of the piston.

According to the present invention, since the piston moves in the axial direction in a state where the outer peripheral surface thereof is guided by the annular guide portion, a guide position by the guide portion on the outer peripheral surface of the piston moves relatively to the side of the driving force transmission mechanism on the piston, as the piston moves in the axial direction to the opposite side of the driving force transmission mechanism. As a result, a support length (guide length), which is a distance between the guide position and the other guide position on the opposite side of the driving force transmission mechanism on the outer peripheral surface of the piston, increases. Therefore, it is possible to prevent more effectively an inclination of the piston when the piston moves in the axial direction. As a consequence, it is possible to suppress abrasion and damage of the piston, a sliding surface of a cylinder portion with the piston, a seal member attached to the piston, and the like.

Furthermore, the present invention is characterized in that the piston is partially formed with a restriction portion that restricts a movement of the piston to the driving force transmission mechanism side by an abutment thereof against the guide portion, and a seal member disposed in the guide portion is positioned on the driving force transmission mechanism side of the restriction portion.

According to the present invention, it is possible to assemble the piston into the cylinder portion while restricting the displacement of the piston by the guide portion, thereby improving assembling property of the piston. If the restriction portion is disposed on the driving force transmission mechanism side of the seal member, a total length of the piston is lengthened by the existence of the restriction portion. However, the total length of the piston can be shortened, because the restriction portion is configured not to be disposed on the driving force transmission mechanism side of the seal member.

Furthermore, the present invention is characterized in that the piston is, at a movement limit position of the piston to the driving force transmission mechanism side, formed such that one end thereof is disposed toward the hydraulic chamber side formed on the opposite side to the driving force transmission mechanism of the piston, and the other end thereof is formed so as to project to a housing side that accommodates the driving force transmission mechanism.

According to the present invention, by ensuring long support length of the piston without increasing the size of the electric brake device in the axial direction of the piston, it is possible to prevent the inclination of the piston more reliably. In addition, it is possible to prevent a brake fluid in the cylinder portion from entering the housing side.

Furthermore, the present invention is characterized in that the cylinder portion includes the cylinder body in which the piston is disposed slidably, and the cylinder body and the housing accommodating the driving force transmission mechanism are formed separately, while the guide portion is accommodated in the cylinder body.

According to the present invention, since all parts disposed in the cylinder body are fluid-tight and restricted so as not to drop off by the guide portion, a work including an assembling work is facilitated as a whole cylinder portion.

Advantageous Effects of Invention

According to the present invention, it is possible to provide an electric brake device capable of preventing a deformation of a piston sliding surface of a cylinder body by suppressing a transmission of a load from the restriction pin to the cylinder body when a displacement of a piston is restricted by a restriction pin.

BRIEF DESCRIPTION OF DRAWINGS

FIG. 4A is a partially omitted enlarged vertical cross-sectional view showing a state in which a first slave piston accommodated in a cylinder body is restricted at a backward position by a restriction pin.

FIG. 4B is a partially enlarged vertical cross-sectional view of FIG. 4A.

FIG. 4C is a front view of the restriction pin shown in FIG. 4A.

FIG. 5A is a partially omitted enlarged vertical cross-sectional view showing a state in which the first slave piston is restricted at a backward position by a restriction pin according to a modified example.

FIG. 5B is a partially enlarged vertical cross-sectional view of FIG. 5A.

FIG. 5C is a front view of the restriction pin according to the modified example.

FIG. 6A is a partially omitted enlarged vertical cross-sectional view showing a state in which the first slave piston is restricted at a backward position by a columnar restriction pin.

FIG. 6B is a partially enlarged vertical cross-sectional view of FIG. 6A.

FIG. 6C is a front view of the columnar restriction pin.

FIG. 7A shows a first example preventing an assembly error of the restriction pin, and is a partially omitted enlarged vertical cross-sectional view showing a state in which the restriction pin is assembled to the cylinder body.

FIG. 7B is a front view of the restriction pin shown in FIG. 7A.

FIG. 8A shows a second example preventing the assembly error of the restriction pin, and is a partially omitted enlarged vertical cross-sectional view showing a state in which the restriction pin is assembled to the cylinder body.

FIG. 8B is a front view of the restriction pin shown in FIG. 8A.

DESCRIPTION OF EMBODIMENTS

Next, embodiments of the present invention will be described in detail with reference to accompanying drawings.

<First Embodiment>

Figure 1:
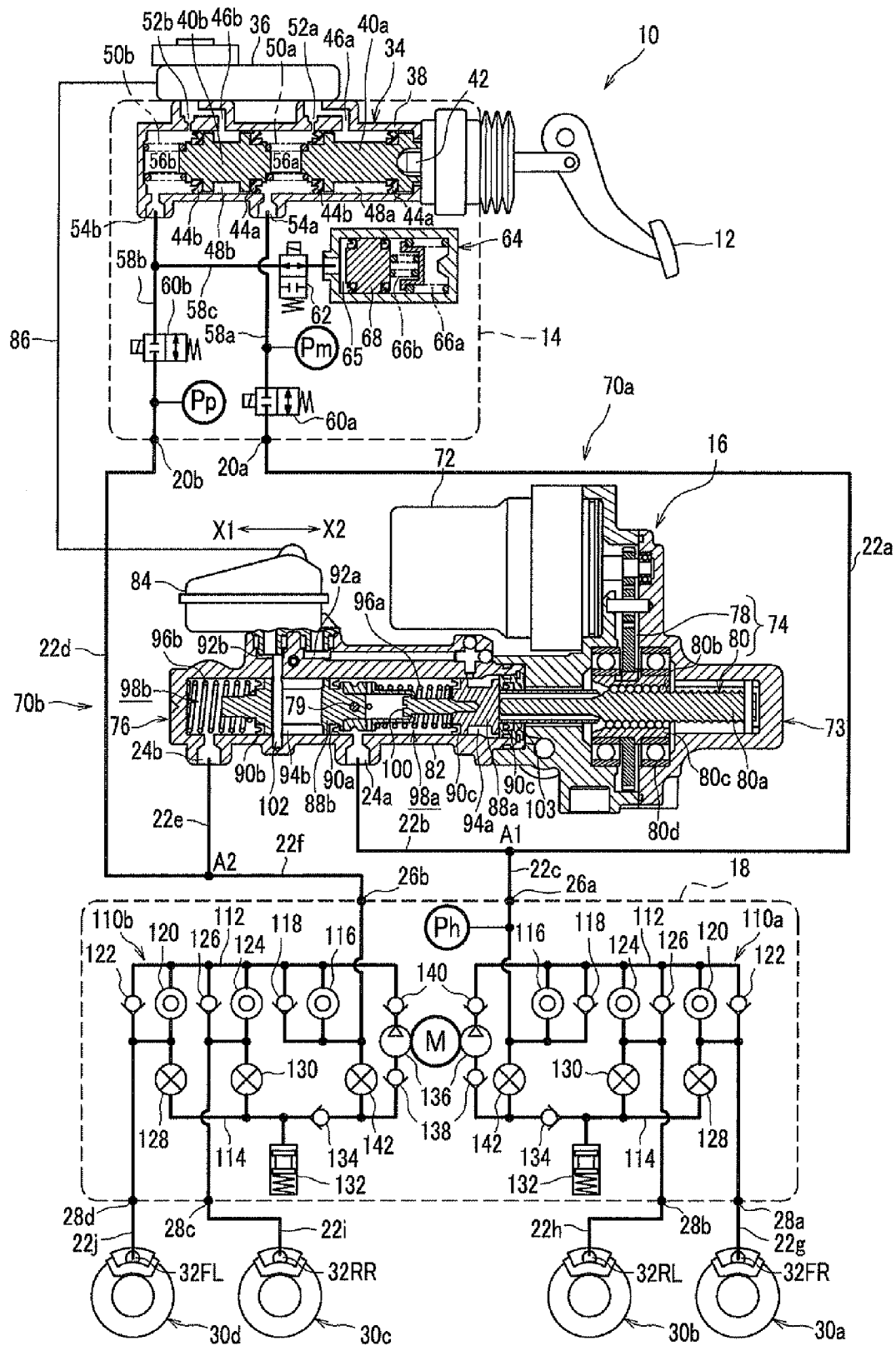
FIG. 1 is a schematic block diagram of a vehicle brake system embedded with an electric brake device according to a first embodiment of the present invention.

FIG. 1 is a schematic block diagram of a vehicle brake system embedded with an electric brake device according to a first embodiment of the present invention.

A vehicle brake system 10 shown in FIG. 1 is configured to include a by-wire type brake system which actuates a brake by transmitting an electrical signal, for use in normal time, as well as a conventional hydraulic brake system which actuates the brake by transmitting a hydraulic pressure, for use in fail-safe time.

Therefore, as shown in FIG. 1, a vehicle brake system 10 is essentially configured to include separately an input device 14 for inputting an operation amount of a brake pedal 12 when the brake pedal 12 is operated by an operator, an electric brake device 16 for controlling a brake hydraulic pressure, and a vehicle stability assist device 18 (hereinafter, referred to as a VSA device 18, VSA; registered trademark) for assisting a stabilization of a vehicle behavior.

The input device 14, the electric brake device 16, and the VSA device 18 are, for example, connected with one another via hydraulic paths made of pipe materials such as hoses and tubes, while the input device 14 and the electric brake device 16 are electrically connected with each other by an unillustrated wire harness as the by-wire type brake system.

Among them, the hydraulic paths will be described. With reference to a connection point A1 in FIG. 1, a connection port 20a of the input device 14 and the connection point A1 are connected by a first piping tube 22a, and an output port 24a of the electric brake device 16 and the connection point A1 are connected by the second piping tube 22b, and further an introduction port 26a of the VSA device 18 and the connection point A1 are connected by the third piping tube 22c.

With reference to another connection point A2 in FIG. 1, another connection port 20b of the input device 14 and the connection point A2 are connected by the fourth piping tube 22d, and another output port 24b of the electric brake device 16 and the connection point A2 are connected by the fifth piping tube 22e, and further another introduction port 26b of the VSA device 18 and the connection point A2 are connected by the sixth piping tube 22f.

The VSA device 18 is provided with a plurality of outlet ports 28a to 28d. A first outlet port 28a is connected to a wheel cylinder 32FR of a disk brake mechanism 30a provided on the front right wheel by a seventh piping tube 22g. A second outlet port 28b is connected to a wheel cylinder 32RL of a disk brake mechanism 30b provided on the rear left wheel by an eighth piping tube 22h. A third outlet port 28c is connected to a wheel cylinder 32RR of a disk brake mechanism 30c provided on the rear right wheel by a ninth piping tube 22i. A fourth outlet port 28d is connected to a wheel cylinder 32FL of a disk brake mechanism 30d provided on the front left wheel by a tenth piping tube 22j.

In this case, a brake fluid is supplied to each of the wheel cylinders 32FR, 32RL, 32RR, and 32FL of the disk brake mechanisms 30a to 30d via the piping tubes 22g to 22j connected to each of the output ports 28a to 28d. Each of the wheel cylinders 32FR, 32RL, 32RR, and 32FL is operated to apply a braking force to the corresponding wheels (the front right wheel, the rear left wheel, the rear right wheel, and the front left wheel) by each hydraulic pressure being increased in each of the wheel cylinders 32FR, 32RL, 32RR, and 32FL.

The vehicle brake system 10 is mountably provided on various vehicles including, for example, a vehicle driven only by an internal combustion engine, a hybrid vehicle, an electric vehicle, and a fuel cell electric vehicle.

The input device 14 includes a tandem-type master cylinder 34 which is capable of generating the hydraulic pressure by the brake pedal 12 operated by a driver (operator), and a first reservoir 36 attached to the master cylinder 34. In a cylinder tube 38 of the master cylinder 34, two pistons 40a, 40b, which are spaced by a predetermined distance from each other in an axial direction of the cylinder tube 38, are disposed slidably. One piston 40a is disposed in close proximity to the brake pedal 12, connected to the brake pedal 12 via a push rod 42, and moved linearly. Further, the other piston 40b is disposed apart from the brake pedal 12 compared to the piston 40a.

On outer peripheral surfaces of this one and the other pistons 40a, 40b, a pair of cup seals 44a, 44b is mounted respectively via annular step portions. Between the pair of cup seals 44a, 44b, back chambers 48a, 48b respectively communicating with supply ports 46a, 46b to be described later, are formed. Further, one spring member 50a is disposed between the one and the other pistons 40a, 40b, and the other spring member 50b is disposed between the other piston 40b and the side end portion of the cylinder tube 38. Incidentally, the pair of cup seals 44a, 44b may be mounted on an inner wall side of the cylinder tube 38 via an annular groove.

The cylinder tube 38 of the master cylinder 34 is provided with the two supply ports 46a, 46b, two relief ports 52a, 52b, and two output ports 54a, 54b. In this case, each of the supply ports 46a, 46b and each of the relief ports 52a, 52b are provided so as to join respectively to communicate with an unillustrated reservoir chamber in the first reservoir 36.

In the cylinder tube 38 of the master cylinder 34, a first pressure chamber 56b and a second pressure chamber 56a, which generate a brake hydraulic pressure corresponding to a depression force of the brake pedal 12 depressed by the driver, are provided. The first pressure chamber 56b is provided to communicate with the connection port 20b via a first hydraulic path 58b, and the second pressure chamber 56a is provided to communicate with the connection port 20a via a second hydraulic path 58a.

Between the master cylinder 34 and the connection port 20b, a first shut-off valve 60b made of a normally open type solenoid valve is provided on the upstream side of the first hydraulic pressure path 58b, while a pressure sensor Pp is provided on the downstream side of the first hydraulic pressure path 58b. The pressure sensor Pp is adapted to detect a hydraulic pressure on the downstream side closer to the wheel cylinders 32FR, 32RL, 32RR, and 32FL than the first shut-off valve 60b on the first hydraulic pressure path 58b.

Between the master cylinder 34 and the connection port 20a, a pressure sensor Pm is provided on the upstream side of the second hydraulic pressure path 58a, while a second shut-off valve 60a made of a normally open type solenoid valve is provided on the downstream side of the second hydraulic pressure path 58a. The pressure sensor Pm is adapted to detect a hydraulic pressure on the upstream side closer to the master cylinder 34 than the second shut-off valve 60a on the second hydraulic pressure path 58a.

"Normally open" of the first shut-off valve 60b and the second shut-off valve 60a means that a normal position (a valving element position when not energized) of the valve is in a state of an open position (normally open). In FIG. 1, the first shut-off valve 60b and the second shut-off valve 60a respectively shows a closed valve state in which a solenoid is energized to actuate an unillustrated valving element.

On the first hydraulic path 58b between the master cylinder 34 and the first shut-off valve 60b, a branch hydraulic path 58c bifurcated from the second hydraulic path 58b is provided, and a third shut-off valve 62 made of a normally closed type solenoid valve and a stroke simulator 64 are connected in series to the branch hydraulic path 58c. "Normally closed" of the third shut-off valve 62 means that a normal position (a valving element position when not energized) of the valve is in a state of a closed position (normally closed). In FIG. 1, the third shut-off valve 62 shows an open valve state in which a solenoid is energized to actuate an unillustrated valving element.

The stroke simulator 64 is a device which makes the operator feel as if the braking force is generated by the depression force by generating a reaction force against a stroke of the brake pedal in a by-wire control, and is disposed on the master cylinder 34 side relative to the first shut-off valve 60b on the first hydraulic path 58b. In the stroke simulator 64, a hydraulic pressure chamber 65 which communicates with the branch hydraulic path 58c is provided, and is capable of absorbing the brake fluid derived from the first pressure chamber 56b of the master cylinder 34.

The stroke simulator 64 includes a first return spring 66a having a high spring constant, a second return spring 66b having a low spring constant, which are arranged in series with each other, and a simulator piston 68 which is urged by the first and second return springs 66a, 66b. The stroke simulator 64 is provided so that the operational feeling for the brake pedal 12 is equivalent to an existing master cylinder.

The hydraulic paths are roughly divided into two hydraulic systems. The first hydraulic system 70b connects the first pressure chamber 56b of the master cylinder 34 and the plurality of wheel cylinders 32RR, 32FL, and the second hydraulic system 70a connects the second pressure chamber 56a of the master cylinder 34 and the plurality of wheel cylinders 32FR, 32RL.

The first hydraulic system 70b includes the first hydraulic path 58b which connects the output port 54b of the master cylinder 34 (cylinder tube 38) in the input device 14 and the connection port 20b, the piping tubes 22d, 22e which connect the connection port 20b of the input device 14 and the output port 24b of the electric brake device 16, the piping tube 22e, 22f which connect the output port 24b of the electric brake device 16 and the introduction port 26b of the VSA device 18, and the piping tubes 22i, 22j which connect the outlet ports 28c, 28d of the VSA device 18 and the wheel cylinders 32RR, 32FL, respectively.

The second hydraulic system 70a includes the second hydraulic path 58a which connects the output port 54a of the master cylinder 34 (cylinder tube 38) in the input device 14 and the connection port 20a, the piping tubes 22a, 22b which connect the connection port 20a of the input device 14 and the output port 24a of the electric brake device 16, the piping tube 22b, 22c which connect the output port 24a of the electric brake device 16 and the introduction port 26a of the VSA device 18, and the piping tubes 22g, 22h which connect the outlet ports 28a, 28b of the VSA device 18 and the wheel cylinders 32FR, 32RL, respectively.

As a consequence, since the hydraulic paths are configured with the first hydraulic system 70b and the second hydraulic system 70a, it is possible to actuate the wheel cylinders 32RR, 32FL and the wheel cylinders 32FR, 32RL independently, thereby generating the braking force independently with each other.

Figure 2:
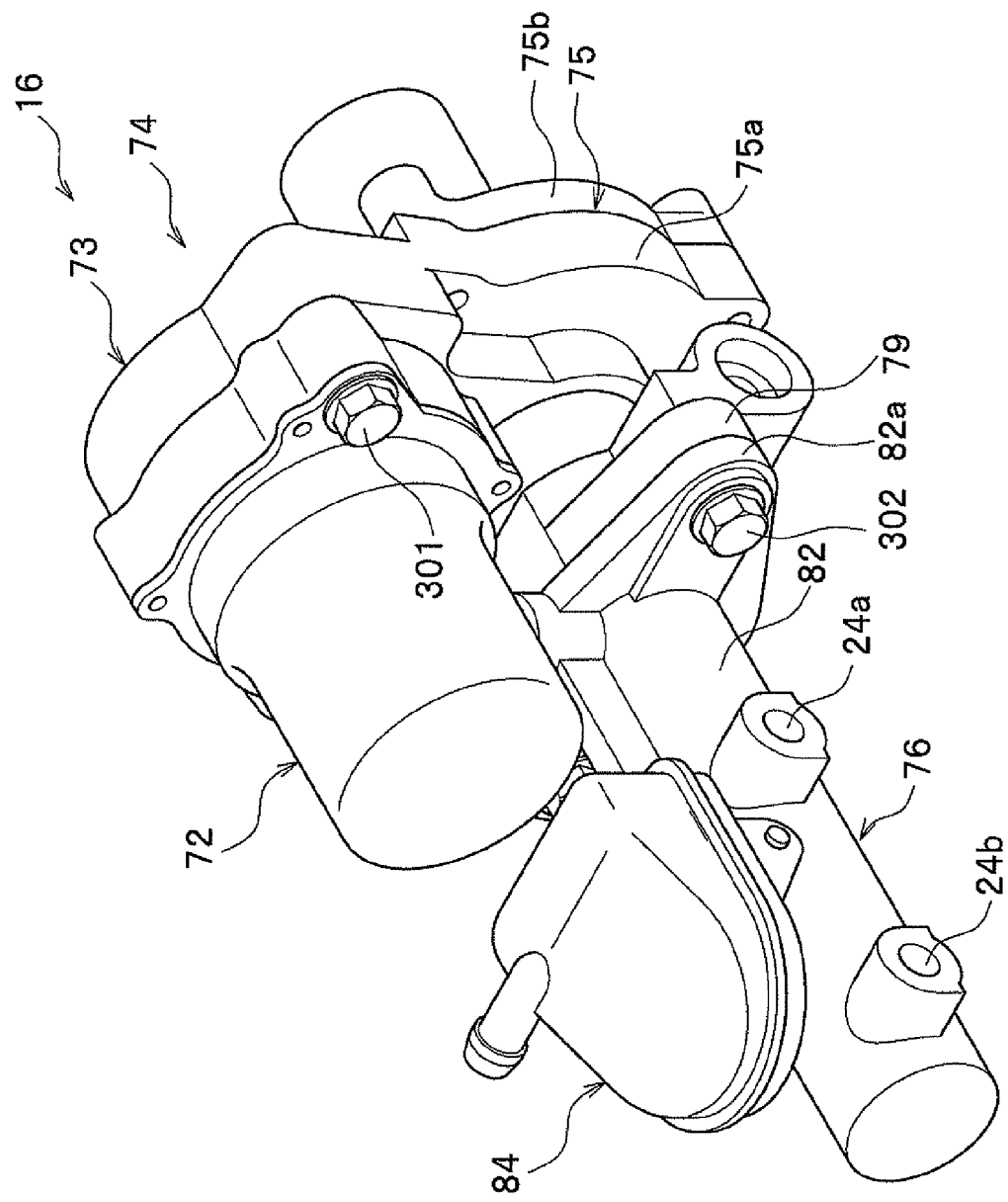
FIG. 2 is a perspective view of the electric brake device shown in FIG. 1.

FIG. 2 is a perspective view of the electric brake device shown in FIG. 1. As shown in FIG. 2, the electric brake device 16 includes an actuator mechanism 74 having an electric motor 72 and a driving force transmission unit 73, and a cylinder mechanism 76 urged by the actuator mechanism 74. In this case, the electric motor 72, the driving force transmission unit 73, and the cylinder mechanism 76 are provided to be separable with one another.

Further, the driving force transmission unit 73 of the actuator mechanism 74 includes a gear mechanism (deceleration mechanism) 78 (see FIG. 1) which transmits a rotational driving force of the electric motor 72, and a ball screw structure (conversion mechanism) 80 (see FIG. 1) which converts the rotational driving force to a linear movement (axis force in a linear direction) and transmits the linear movement to the first and second slave pistons 88b, 88a (described below) side of the cylinder mechanism 76.

The electric motor 72 is, for example, composed of a servo motor which is controlled to be driven based on a control signal (electrical signal) from an unillustrated control unit, and disposed above the actuator mechanism 74. By arranging this configuration, it is possible to avoid appropriately an oil component of grease or the like in the driving force transmission unit 73 from entering the electric motor 72 by gravity action. Incidentally, the electric motor 72 is fastened to an actuator housing 75 to be described later via screw members 301.

The driving force transmission unit 73 has the actuator housing 75. Driving force transmission mechanical elements such as the gear mechanism (deceleration mechanism) 78 and the ball screw structure (conversion mechanism) 80 are accommodated in a space portion of the actuator housing 75. As shown in FIG. 2, the actuator housing 75 is configured to be divided into a first body 75a which is disposed on the cylinder mechanism 76 side, and a second body 75b which closes an open end of the first body 75a opposite to the cylinder mechanism 76.

As shown in FIG. 2, a flange portion 79 is provided on the end portion of the first body 75a on the cylinder mechanism 76 side, and a pair of threaded holes (not shown) for mounting the cylinder mechanism 76 is provided in the flange portion 79. In this case, a pair of screw members 302 passing through a flange portion 82a provided at the other end portion of a cylinder body 82 to be described later is screwed into the pair of threaded holes, so that the driving force transmission unit 73 and the cylinder mechanism 76 are coupled integrally.

As shown in FIG. 1, the ball screw structure 80 includes a ball screw shaft 80a which abuts against a second slave piston 88a of the cylinder mechanism 76 at one end portion thereof in the axial direction, a plurality of balls 80b which roll along a helical screw groove formed on the external peripheral surface of the ball screw shaft 80a, a substantially cylindrical nut member 80c which is fitted in a ring gear of the gear mechanism 78 to rotate integrally with the ring gear and screwed with the balls 80b, and a pair of ball bearings 80d which rotatably support one end side and the other end side in the axial direction of the nut member 80c, respectively. Incidentally, the nut member 80c is, for example, secured by being press-fitted into an inner diameter surface of the ring gear of the gear mechanism 78.

By such a configuration of the driving force transmission unit 73, after the rotational driving force of the electric motor 72 transmitted via the gear mechanism 78 is inputted to the nut member 80c, the rotational driving force is converted to the axis force (linear movement) in the linear direction by the ball screw structure 80, and the ball screw shaft 80a is reciprocated in the axial direction.

Figure 3:
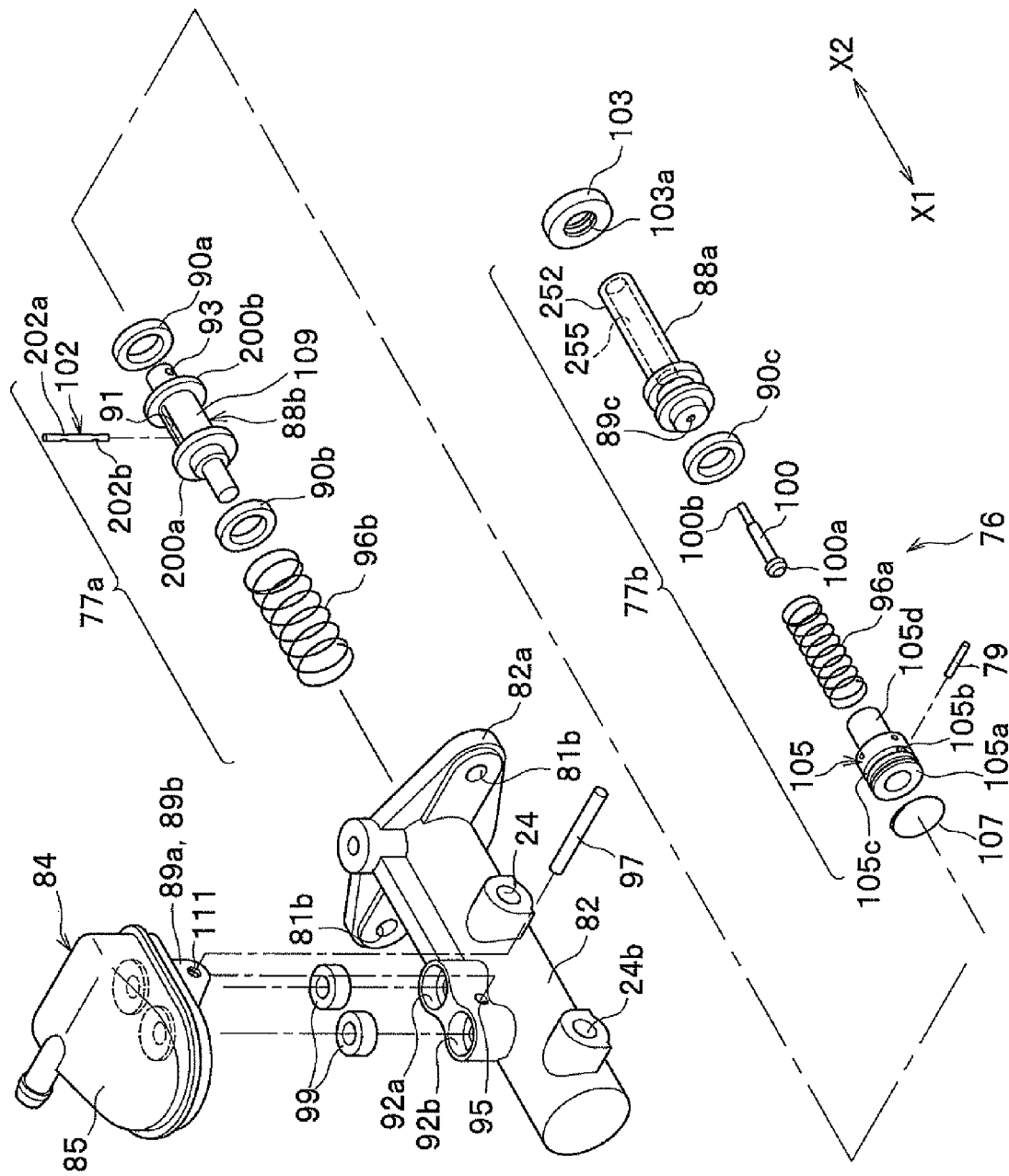
FIG. 3 is an exploded perspective view of a cylinder mechanism.

FIG. 3 is an exploded perspective view of the cylinder mechanism, FIG. 4A is a partially omitted enlarged vertical cross-sectional view showing a state in which a first slave piston accommodated in the cylinder body is restricted at a backward position by a restriction pin, FIG. 4B is a partially enlarged vertical cross-sectional view of FIG. 4A, and FIG. 4C is a front view of the restriction pin shown in FIG. 4A.

The electric brake device 16 is operative to generate the brake hydraulic pressure by transmitting the driving force of the electric motor 72 via the driving force transmission unit 73 to a first slave piston 88b and the second slave piston 88a of the cylinder mechanism 76, and by driving forward the first slave piston 88b and the second slave piston 88a. In the following description, a displacement in a direction of an arrow X1 of the first slave piston 88b and the second slave piston 88a is described as "forward movement", and a displacement in a direction of an arrow X2 is described as "backward movement". Also, the arrow X1 indicates "forward" and the arrow X2 indicates "backward".

As shown in FIG. 3, the cylinder mechanism 76 includes a first piston mechanism 77a which is configured to be assembled integrally with peripheral components including the first slave piston 88b, and a second piston mechanism 77b which is configured to be assembled integrally with peripheral components including the second slave piston 88a. The first piston mechanism 77a and the second piston mechanism 77b are configured to be integrally assembled via a coupling pin 79 which will be described later. Although the cylinder mechanism 76 is described as a tandem type using two pistons of the first slave piston 88b and the second slave piston 88a in the first embodiment, it is not limited to this. For example, the cylinder mechanism 76 may be one which uses only the single first slave piston 88b.

The first piston mechanism 77a includes the first slave piston 88b which is disposed to face a first hydraulic chamber 98b (see FIG. 1) in front of the cylinder body 82 of a bottomed cylindrical shape and disposed slidably along an inner peripheral wall (piston sliding surface) 83 of the cylinder body 82, a restriction pin (restriction unit) 102 which is secured to the cylinder body 82 and restricts a movement range of the first slave piston 88b by abutting against a first flange portion 200a or a second flange portion 200b, which will be described later, of the first slave piston 88b, a pair of cup seals 90a, 90b which is mounted on an annular step portion of the first slave piston 88b, and a first spring 96b which is disposed between the first slave piston 88b and a side end portion (bottom wall) of the cylinder body 82 and pushes the first slave piston 88b toward the backward (arrow X2).

The restriction pin 102 is adapted to function as the restriction unit which restricts the backward movement of the first slave piston 88b, for example, when the hydraulic pressure derived from the first pressure chamber 56b of the master cylinder 34 (outside) is applied to the first hydraulic chamber (output hydraulic chamber) 98b.

As shown in FIG. 4C, on an outer surface of an upper end portion side (one end portion side) in the axial direction of the restriction pin 102, an annular first groove portion 202a reduced in diameter gradually from both sides in the axial direction is formed. Further, on a lower end portion side (the other end portion side) in the axial direction of the restriction pin 102, an annular second groove portion 202b reduced in diameter gradually from both sides in the axial direction is formed similarly to the first groove portion 202a. Incidentally, the first groove portion 202a and second groove portion 202b are adapted to function as a reduced diameter portion having a reduced outer diameter of the restriction pin 102 at a portion corresponding to the inner peripheral wall 83 of the cylinder body 82.

At a portion where the restriction pin 102 is secured to the cylinder body 82 in a direction perpendicular to the axial direction of the cylinder body 82, the first groove portion 202a and second groove portion 202b formed on the outer surface of the restriction pin 102 are formed to overlap with the inner peripheral wall 83 of cylinder body 82 in a radial direction perpendicular to the inner peripheral wall 83 of the cylinder body 82, so that clearances 204 are formed between the inner peripheral wall 83 of the cylinder body 82 and the first groove portion 202a and second groove portion 202b.

By providing the clearances 204, it is possible to prevent the inner peripheral wall 83 (piston sliding surface) of the cylinder body 82 from being deformed by a load applied to the restriction pin 102 when the restriction pin 102 and the first slave piston 88b come into contact with each other. This is because it is possible to separate the load transmission point A transmitting the load to the cylinder body 82 side, to a position radially outward from the effective inner diameter B of the cylinder body 82. Note that, in FIG. 4A, a point C indicates the load transmission point where the load is transmitted to the cylinder body 82 side by the restriction pin in a case of using an columnar restriction pin which has been conventionally used.

As shown in FIG. 4A, in an insertion direction of the restriction pin 102 against the cylinder body 82, an axial length T1 of a support portion of the restriction pin 102 supported by the cylinder body 82 is set to be longer than an axial length T2 of the clearance 204 (T1>T2). In this manner, it is possible to ensure a desired support strength of the restriction pin 102 by setting the axial length T1 of the support portion longer than the axial length T2 of the clearance 204 (T1>T2).

FIG. 5A is a partially omitted enlarged vertical cross-sectional view showing a state in which the first slave piston is restricted at a backward position by a restriction pin according to a modified example, FIG. 5B is a partially enlarged vertical cross-sectional view of FIG. 5A, and FIG. 5C is a front view of the restriction pin according to the modified example.

As shown in FIG. 5C, a restriction pin 102a according to the modified example has a recess portion 212 formed by a first tapered portion 210a which is formed on an outer surface of an upper end portion side (one end portion side) in an axial direction of the restriction pin 102a and reduces in a diameter gradually, a second tapered portion 210b which is formed on a lower end portion side (the other end portion side) in the axial direction and reduces in a diameter gradually, and a reduced diameter intermediate portion 210c which is formed between the first tapered portion 210a and the second tapered portion 210b and has a constant outer diameter in the axial direction.

The recess portion 212 is adapted to function as a reduced diameter portion having a reduced outer diameter of the restriction pin 102a at a portion corresponding to the inner peripheral wall 83 of the cylinder body 82. The reduced diameter portion is not limited to the recess portion, and it may be any one of, for example, grooves, tapers, and recesses of entire reduced diameter, or it may be a composite shape thereof.

In this case, at the portion where the restriction pin 102a is secured to the cylinder body 82 in the direction perpendicular to the axial direction of the cylinder body 82, the recess portion 212 formed on the outer surface of the restriction pin 102a according to the modified example are formed to overlap with the inner peripheral wall 83 of the cylinder body 82 in the radial direction perpendicular to the inner peripheral wall 83 of the cylinder body 82, so that clearances 204 are formed between the inner peripheral wall 83 of the cylinder body 82 and the recess portion 212.

By forming the reduced diameter portions composed of the first groove portion 202a and the second groove portion 202b, or the recess portion 212 on the outer surface of the restriction pin 102 or the restriction pin 102a, it is possible to separate the outer surfaces of the restriction pins 102, 102a from the inner peripheral wall 83 of the cylinder body 82 via the clearance 204. In this case, since machining for the inner peripheral wall 83 of the cylinder body 82 is not required, it is possible to reduce the manufacturing cost.

FIGS. 6A, 6B, 6C show an example in a case where a clearance 204 is formed by machining the inner peripheral surface 83 of the cylinder body 82 with use of a restriction pin 102b made of a normal columnar body.

FIG. 6A is a partially omitted enlarged vertical cross-sectional view showing a state in which the first slave piston is restricted at a backward position by a columnar restriction pin, FIG. 6B is a partially enlarged vertical cross-sectional view of FIG. 6A, and FIG. 6C is a front view of the columnar restriction pin.

As shown in FIG. 6A, in an opening portion of an engaging hole 208 of the cylinder body 82 for supporting the restriction pin 102b, an annular tapered surface 214 inclined at a predetermined angle about the axis of the restriction pin 102b is formed. The clearance 204 is formed between the annular tapered surface 214 formed on the inner peripheral wall 83 of the cylinder body 82 and an outer peripheral surface of the restriction pin 102b made of the columnar body. The annular tapered surface 214 is adapted to function as an enlarged diameter portion having an enlarged diameter of the inner peripheral wall 83 of the cylinder body 82 which supports the restriction pin 102b.

By providing the clearances 204 as shown in FIGS. 5 and 6, it is possible to prevent the inner peripheral wall 83 (piston sliding surface) of the cylinder body 82 from being deformed by a load applied to the restriction pins 102a, 102b when the restriction pins 102a, 102b and the first slave piston 88b come into contact with each other. This is because it is possible to separate the load transmission point A transmitting the load to the cylinder body 82 side, to a position radially outward from the effective inner diameter B of the cylinder body 82.

Referring back to FIG. 3, the restriction pin 102 is inserted and secured in a direction perpendicular to the axial direction of the cylinder body 82. That is, when the restriction pin 102 is assembled to the cylinder body 82, the restriction pin 102 is inserted from an opening portion of a reservoir port 92b, and an upper portion and lower end portion of the restriction pin 102 are respectively inserted and secured to a securing hole 207 on an upper portion side of the cylinder body 82 and the engaging hole 208 on a lower portion side of the cylinder body 82 (see FIG. 4A). The securing hole 207 and the engaging hole 208 are formed in a direction perpendicular to the axial direction of the cylinder body 82. As a result, in the first embodiment, it is possible to extend a contact length of the restriction pin 102 with the cylinder body 82 by the securing hole 207 on the upper portion side and the engaging hole 208 on the lower portion side. Incidentally, the restriction pin 102 may be secured by being press-fitted into the engaging hole 208 of the cylinder body 82.

Furthermore, an upper end portion (head portion) of the restriction pin 102 is prevented from slipping out by abutting against a connecting leg portion 85a provided on a lower surface of a reservoir body 85 of a second reservoir 84. In this case, as the second reservoir 84 is adapted to function as a pressing member for pressing the head portion of the restriction pin 102, it is possible to prevent slipping out of the restriction pin 102 and perform position regulation of the restriction pin 102 reliably. In addition, for example, by providing a clearance between the upper end portion of the restriction pin 102 and the connecting leg portion 85a, the second reservoir 84 may prevent slipping out of the restriction pin 102 when the restriction pin 102 is displaced upward and the upper end portion of the restriction pin 102 abuts against the connecting leg portion 85a.

As shown in FIG. 3, the first slave piston 88b has a piston body 109, and an annular pair of the first flange portion 200a and second flange portion 200b having larger diameters than that of the piston body 109 are formed separated by a predetermined distance in the front and rear of the piston body 109.

Between the first flange portion 200a and the second flange portion 200b, a through hole 91 penetrating in a direction perpendicular to the axial direction of the first slave piston 88b is formed, and the restriction pin 102 is inserted into the through hole 91 from a direction perpendicular to the axial direction of the cylinder body 82. As shown in FIG. 4A, the through hole 91 is formed so as to extend to the second flange portion 200b from the first flange portion 200a in the axial direction of the first slave piston 88b.

The first flange portion 200a is partially formed with restriction portions 206 which abuts against the restriction pin 102 at the backward position (backward stroke end) of the first slave piston 88b. The restriction portions 206 are disposed so as to extend continuously from the through hole 91 in a direction perpendicular to the axial direction of the piston body 109 (see FIG. 4A).

Incidentally, the displacement end position (forward stroke end) in the forward side of the first slave piston 88b is restricted by a tip end reduced diameter portion in the axial direction of the first slave piston 88b abutting against a bottom portion (inner wall) of the cylinder body 82.

The restriction portions 206, which abut against the restriction pin 102 secured to the cylinder body 82, are formed on the first flange portion 200a, so that the restriction portions 206 can be provided on outer peripheral sides of the first slave piston 88b than the piston body 109.

As shown in FIG. 4A, the restriction portions 206 are formed respectively on an upper portion side and a lower portion side of the first flange portion 200a, where the through hole 91 exists therebetween, and an abutting surface of the restriction pin 102 is configured including the through hole 91.

Thus, in the first embodiment, as the restriction pin 102 is provided so as to abut against not only the through hole 91 of the piston body 109 but also the restriction portions 206 of the first flange portion 200a, it is possible to extend a contact length of the restriction pin 102 and the first slave piston 88b compared with a case in which the restriction pin 102 abuts against only an unillustrated through hole (unillustrated through hole formed with a length which does not reach the first flange portion 200a in the axial direction) of the piston body 109.

In other words, as the abutting surface of the restriction pin 102 against the first slave piston 88b is added with the restriction portions 206 of the first flange portion 200a which projects radially outwardly from the piston body 109 in addition to the through hole 91 of the piston body 109, it is possible to extend the contact length of the restriction pin 102 with the first slave piston 88b by this added length.

In addition, the restriction pin 102 is provided to abut against the restriction portions 206 of the first flange portion 200a, so that a bending moment applied to the restriction pin 102 can be suppressed.

In the rear of the first slave piston 88b, an insertion hole 93, through which the coupling pin 79 is inserted in a state where a cylindrical portion 105a of a coupling piston 105 to be described later is fitted onto the first slave piston 88b, is formed.

As shown in FIG. 3, the second piston mechanism 77b includes the second slave piston 88a disposed so as to face a second hydraulic chamber 98a behind (in the arrow X2 direction of) the first slave piston 88b, a cup seal 90c mounted on a shaft portion in front of the second slave piston 88a, and a second spring 96a which is disposed between the first slave piston 88b and the second slave piston 88a, and urges the first slave piston 88b and the second slave piston 88a in a direction separating them from each other. In addition, a piston guide 103 shown in FIG. 3 is mounted after assembly of the first piston mechanism 77a and second piston mechanism 77b, seals an outer peripheral surface of a rod portion 252 in the rear of the second slave piston 88a, and provides a function of guiding the second slave piston 88a in a straight line.

Further, the second piston mechanism 77b includes a bolt member 100 for restricting a separated position of the first slave piston 88b and the second slave piston 88a, the coupling piston 105 which is coupled to the first slave piston 88b by the coupling pin 79, and an annular clip 107 which has a starting end and terminating end superimposed in an arc shape and capable of partially enlarging a diameter thereof, and holds the coupling pin 79 by an elastic force thereof.

The second slave piston 88a has a front shaft portion formed with a mounting hole 89c in which one end portion 100b of the bolt member 100 is mounted, and the rod portion 252 in the rear of the second slave piston 88a has the inside formed with a through hole 255 abutting against one end portion of the ball screw shaft 80a.

As shown in FIG. 3, the coupling piston 105 includes a cylindrical portion 105a which is provided in front portion in the axial direction and fitted onto a rear shaft portion of the first slave piston 88b, a through hole 105b which penetrates the cylindrical portion 105a in a direction perpendicular to the axial direction of the cylindrical portion 105a and into which the coupling pin 79 is inserted, a mounting groove 105c which is formed on an outer peripheral surface of the cylindrical portion 105a and on which the annular clip 107 is mounted, and an engagement portion 105d which is provided behind in the axial direction of the cylindrical portion 105a and formed with an engaging hole with which a head portion 100a of the bolt member 100 is engaged.

The second slave piston 88a is disposed in close proximity to the ball screw structure 80 side, and provided to be displaced in the direction of the arrow X1 or in the direction of the arrow X2 integrally with the ball screw shaft 80a by abutting against one end portion of the ball screw shaft 80a via the through hole 255. The first slave piston 88b is disposed at a position spaced from the ball screw structure 80 side compared to the second slave piston 88a.

On outer peripheral surfaces of the first and second slave pistons 88b, 88a, a first back chamber 94b and a second back chamber 94a respectively communicating with reservoir ports 92b, 92a to be described later, are formed respectively (see FIG. 1).

The cylinder body 82 of the cylinder mechanism 76 is provided with the two reservoir ports 92a, 92b, the two output ports 24a, 24b, and a pin insertion hole 95 into which an engagement pin 97 is inserted. In this case, the reservoir ports 92a, 92b are provided to communicate with an unillustrated reservoir chamber in the second reservoir 84.

The cylinder mechanism (cylinder) 76 has the second reservoir 84 attached to the cylinder body 82. The second reservoir 84 is provided to be connected to the first reservoir 36 attached to the master cylinder 34 of the input device 14 by a piping tube 86, so that the brake fluid reserved in the first reservoir 36 is supplied into the second reservoir 84 via the piping tube 86 (see FIG. 1).

As shown in FIG. 3, the second reservoir 84 has a reservoir body 85, and the reservoir body 85 has a lower surface provided with a pair of connecting leg portions 85a, 85b (see FIG. 5) connected to the reservoir ports 92a, 92b of the cylinder body 82, and a pair of attaching projecting portions 89a, 89b (however, the attaching projecting portion 89b is not shown in FIG. 3) which is disposed facing each other on both sides thereof and formed with a through hole 111 through which the engagement pin 97 is inserted. The pair of connecting leg portions 85a, 85b has outer peripheral surfaces respectively mounted with seal members 99 of ring shape, and the seal members 99 seal connection portions between the connecting leg portions 85a, 85b of the second reservoir 84 and the reservoir ports 92a, 92b of the cylinder body 82.

In a state where the pair of connecting leg portions 85a, 85b mounted with seal members 99 of the second reservoir 84 is inserted into the pair of reservoir ports 92a, 92b of the cylinder body 82, and the second reservoir 84 is pressed from above, the second reservoir 84 is assembled integrally with the cylinder body 82 by inserting the engagement pin 97 into the through hole 111 of one connecting projecting portion 89a of the reservoir body 85, the pin insertion hole 95 of the cylinder body 82, and the through hole 111 of the other connecting projecting portion 89b of the reservoir body 85.

In this case, the seal member 99 of a ring shape is, for example, formed of an elastic member such as rubber, and exhibits a retaining function, and thus it is possible to easily assemble the second reservoir 84 to the cylinder body 82 by inserting the engagement pin 97 into the pin insertion hole 95.

The cylinder body 82 includes therein the first hydraulic chamber (output hydraulic chamber) 98b which controls the brake hydraulic pressure outputted from the output port 24b to the side of the wheel cylinders 32RR, 32FL, and the second hydraulic chamber 98a which controls the brake hydraulic pressure outputted from the output port 24a to the side of the wheel cylinders 32FR, 32RL.

Between the first slave piston 88b and the second slave piston 88a, a bolt member 100 which restricts a maximum separated position and a minimum separated position of the first slave piston 88b and the second slave piston 88a is provided. Further, on the first slave piston 88b, the restriction pin 102, which is engaged with the through hole 91 penetrating in a direction substantially perpendicular to the axis of the first slave piston 88b, and restricts a sliding range of the first slave piston 88b to prevent over-return to the second slave piston 88a side, is provided. In this manner, when one system fails, a failure in the other system is prevented, particularly during a backup time when braking by the brake hydraulic pressure generated in the master cylinder 34.

Further, as shown in FIG. 3, on an opening portion of the cylinder body 82, a piston guide 103 is mounted via an unillustrated circlip. The inner peripheral surface of the piston guide 103 is provided with a seal member 103a to seal the second slave piston 88a by surrounding the outer peripheral surface of the rod portion 252 of the second slave piston 88a. By sliding the rod portion 252 of the second slave piston 88a along the seal member 103a, it is possible to guide linearly the second slave piston 88a which abuts against one end of the ball screw shaft 80a. Further, the coupling piston 105 is connected to the first slave piston 88b, and the coupling piston 105 includes the engagement portion 105d with which the head portion 100a of the bolt member 100 is engaged.

Returning to FIG. 1, the VSA device 18 is composed of well known components, and includes a first brake system 110b for controlling the first hydraulic system 70b connected to the disk brake mechanisms 30c, 30d (wheel cylinders 32RR, 32FL) of the rear right wheel and the front left wheel, and a second brake system 110a for controlling the second hydraulic system 70a connected to the disk brake mechanisms 30a, 30b (wheel cylinders 32FR, 32RL) of the front right wheel and the rear left wheel.

Here, the second brake system 110a may be a hydraulic system connected to the disk brake mechanisms mounted on the front left wheel and the front right wheel, and the first brake system 110b may be a hydraulic system connected to the disk brake mechanisms mounted on the rear left wheel and the rear right wheel. Further, the second brake system 110a may be a hydraulic system connected to the disk brake mechanisms mounted on the front right wheel and the rear right wheel on one side of the vehicle body, and the first brake system 110b may be a hydraulic system connected to the disk brake mechanisms mounted on the front left wheel and the rear left wheel on the other side of the vehicle body.

Since the first brake system 110b and the second brake system 110a have the same structures with each other, those corresponding to each other in the first brake system 110b and in the second brake system 110a are given the same reference numerals, and descriptions thereof will be focused on the second brake system 110a and descriptions of the first brake system 110b will be appended in parentheses.

The second brake system 110a (first brake system 110b) includes a first common hydraulic path 112 and a second common hydraulic path 114, which are common to the wheel cylinders 32FR, 32RL (32RR, 32FL). The VSA device 18 includes a regulator valve 116, a first check valve 118, a first inlet valve 120, a second check valve 122, a second inlet valve 124, and a third check valve 126. The regulator valve 116 is made of a normally open type solenoid valve disposed between the introduction port 26a and the first common hydraulic path 112. The first check valve 118 is disposed in parallel with the regulator valve 116, and allows the brake fluid to flow from the side of the introduction port 26a to the side of the first common hydraulic path 112 (prevents the brake fluid from flowing to the side of the introduction port 26a from the side of the first common hydraulic path 112). The first inlet valve 120 is made of a normally open type solenoid valve disposed between the first common hydraulic path 112 and the first output port 28a. The second check valve 122 is disposed in parallel with the first inlet valve 120, and allows the brake fluid to flow from the side of the first output port 28a to the side of the first common hydraulic path 112 (prevents the brake fluid from flowing to the side of the first output port 28a from the side of the first common hydraulic path 112). The second inlet valve 124 is made of a normally open type solenoid valve disposed between the first common hydraulic path 112 and the second output port 28b. The third check valve 126 is disposed in parallel with the second inlet valve 124, and allows the brake fluid to flow from the side of the second output port 28b to the side of the first common hydraulic path 112 (prevents the brake fluid from flowing to the side of the second output port 28b from the side of the first common hydraulic path 112).

Further, the VSA 18 includes a first outlet valve 128, a second outlet valve 130, a reservoir 132, a fourth check valve 134, a pump 136, an intake valve 138, a discharge valve 140, a motor M, and a suction valve 142. The first outlet valve 128 is made of a normally closed type solenoid valve disposed between the first output port 28a and the second common hydraulic path 114. The second outlet valve 130 is made of a normally closed type solenoid valve disposed between the second output port 28b and the second common hydraulic path 114. The reservoir 132 is connected to the second common hydraulic path 114. The fourth check valve 134 is disposed between the first common hydraulic path 112 and the second common hydraulic path 114, and allows the brake fluid to flow from the side of the second common hydraulic path 114 to the side of the first common hydraulic path 112 (prevents the brake fluid from flowing to the side of the second common hydraulic path 114 from the side of the first common hydraulic path 112). The pump 136 is disposed between the fourth check valve 134 and the first common hydraulic path 112, and supplies the brake fluid from the side of the second common hydraulic path 114 to the side of the first common hydraulic path 112. The intake valve 138 and the discharge valve 140 are disposed respectively before and after the pump 136 driven by the motor M. The suction valve 142 is made of a normally closed type solenoid valve disposed between the second common hydraulic path 114 and the introduction port 26a.

In the second brake system 110a, a pressure sensor Ph for detecting the brake hydraulic pressure outputted from the output port 24a of the electric brake device 16 and controlled in the second hydraulic pressure chamber 98a of the electric brake device 16, is disposed on the hydraulic path adjacent to the introduction port 26a. Detection signals detected by each of the pressure sensors Pm, Pp, and Ph are introduced into an unillustrated control unit. Further, in the VSA device 18, a VSA control is performed, and an ABS control is also performed.

The vehicle brake system 10 assembled with the electric brake device 16 according to the first embodiment is constructed essentially as described above, and the operational effects thereof will be described below.

In a normal state where the vehicle brake system 10 works properly, the first shutoff valve 60b and the second shutoff valve 60a made of normally open type solenoid valves are in the closed valve state by energization, and the third shutoff valve 62 made of a normally closed type solenoid valve is in the open valve state by energization. Therefore, the brake hydraulic pressure generated by the master cylinder 34 of the input device 14 is not transmitted to the wheel cylinders 32FR, 32RL, 32RR, 32FL of the disk brake mechanisms 30a to 30d, because the first hydraulic system 70b and the second hydraulic system 70a are shut off by the first shutoff valve 60b and the second shutoff valve 60a.

In this case, the brake hydraulic pressure generated in the first pressure chamber 56b of the master cylinder 34 is transmitted to the hydraulic pressure chamber 65 of the stroke simulator 64 via the branch hydraulic path 58c and the third shutoff valve 62 in the open valve state. By the brake hydraulic pressure supplied to the hydraulic pressure chamber 65, the simulator piston 68 is displaced against the spring force of spring members 66a, 66b, so that a stroke of the brake pedal 12 is allowed while a pseudo-pedal reaction force is generated to be applied to the brake pedal 12. As a consequence, a brake feeling which is not uncomfortable for the driver is obtained.

In such a state of the brake system, upon detecting the depression of the brake pedal 12 by the driver, the unillustrated control unit drives the electric motor 72 of the electric brake device 16 to urge the actuator mechanism 74, and displaces (moves forward) the first slave piston 88b and the second slave piston 88a toward the direction of the arrow X1 in FIG. 1, against the spring forces of the first spring 96b and the second spring 96a. By the displacement of the first slave piston 88b and the second slave piston 88a, the brake hydraulic pressure in the first hydraulic pressure chamber 98b and the brake hydraulic pressure in the second hydraulic pressure chamber 98a are pressurized to be balanced with each other, thereby generating an intended brake hydraulic pressure.

The brake hydraulic pressure in the first hydraulic pressure chamber 98b and the second hydraulic pressure chamber 98a of the electric brake device 16 are transmitted to the wheel cylinders 32FR, 32RL, 32RR, 32FL of the disk brake mechanisms 30a to 30d via the first and second inlet valves 120, 124 in the open valve state of the VSA device 18, and an intended braking force is applied to each of the wheels by the operations of the wheel cylinders 32FR, 32RL, 32RR, 32FL.

In other words, in the vehicle brake system 10 according to the first embodiment, in a normal state where the electric brake device 16 functioning as a power hydraulic pressure source, an unillustrated ECU performing a by-wire control, and the like are operational, the brake system of so-called brake-by-wire type is active. The brake system of brake-by-wire type activates the disk brake mechanisms 30a to 30d by the brake hydraulic pressure generated by the electric brake device 16, in a state where the communication of the master cylinder 34 which generates the brake hydraulic pressure by the brake pedal 12 depressed by the driver with the disk brake mechanisms 30a to 30d (wheel cylinders 32FR, 32RL, 32RR, 32FL) which brakes each of the wheels, is shut off by the first shutoff valve 60b and the second shutoff valve 60a.

On the other hand, in an abnormal state where the electric brake device 16 and the like are inoperative, the brake system of so-called conventional hydraulic type is active. The brake system of hydraulic type activates the disk brake mechanisms 30a to 30d (wheel cylinders 32FR, 32RL, 32RR, 32FL) by transmitting the brake hydraulic pressure generated by the master cylinder device 34 to the disk brake mechanisms 30a to 30d (wheel cylinders 32FR, 32RL, 32RR, 32FL), while the first shutoff valve 60b and the second shutoff valve 60a are respectively in the open valve states and the third shutoff valve 62 is in the closed valve state.

In the first embodiment, for example, the restriction pin 102 for restricting the backward movement of the first slave piston 88b is provided so as to ensure a minimum brake hydraulic pressure in the wheel cylinders 32FR, 32RL, 32RR, 32FL, when the hydraulic pressure derived from the first pressure chamber 56b of the master cylinder 34 (outside) is applied to the first hydraulic chamber (output hydraulic chamber) 98b of the electric brake device 16 during a power failure and failure of the second hydraulic system 70a including the second slave piston 88a.

In the first embodiment, as the clearance 204 is formed between the inner peripheral wall 83 of the cylinder body 82 and the first groove portion 202a and second groove portion 202b formed on the outer surface of the restriction pin 102, it is possible to prevent the inner peripheral wall 83 (piston sliding surface) of the cylinder body 82 from being deformed by the load applied to the restriction pin 102 when the restriction pin 102 and the first slave piston 88b come into contact with each other. This is because it is possible to separate the load transmission point A transmitting the load to the cylinder body 82 side, to a position radially outward from the effective inner diameter B of the cylinder body 82.

Thus, in the first embodiment, on the inner peripheral wall 83 of the cylinder body 82 for supporting the restriction pin 102, by providing the clearance 204 for separating the outer surface of the restriction pin 102 from the inner peripheral wall 83 of the cylinder body 82, it is possible to separate the load transmission point A radially outward from the effective inner diameter B of the cylinder body 82 (see FIG. 4A), thereby suppressing the deformation of the inner peripheral wall 83 of the cylinder body 82. As a result, in the first embodiment, it is possible to ensure a desired sliding performance in the piston sliding surface of the cylinder body 82.

In the first embodiment, since the restriction pin 102 is provided so as to abut against not only the through hole 91 of the piston body 109 but also the restriction portions 206 of the first flange portion 200a, it is possible to extend the contact length of the restriction pin 102 and the first slave piston 88b compared with the case in which the restriction pin 102 abuts against only the unillustrated through hole (unillustrated through hole formed with a length which does not reach the first flange portion 200a in the axial direction) of the piston body 109.

Further, in the first embodiment, when the restriction pin 102 is assembled to the cylinder body 82, the upper portion and lower end portion of the restriction pin 102 are inserted and secured respectively to the securing hole 207 on the upper portion side of the cylinder body 82 and the engaging hole 208 on the lower portion side of the cylinder body 82, while the securing hole 207 and the engaging hole 208 are formed in the direction perpendicular to the axial direction of the cylinder body 82. Therefore, it is possible to extend the contact length of the restriction pin 102 with the cylinder body 82 by the securing hole 207 on the upper portion side and the engaging hole 208 on the lower portion side of the cylinder body 82. In this case, it is possible to disperse and support the load applied to the restriction pin 102 by two points which are the securing hole 207 on the upper portion side and the engaging hole 208 on the lower portion side of the cylinder body 82.

Furthermore, in the first embodiment, in the insertion direction of the restriction pin 102 for the cylinder body 82, the axial length T1 of the support portion of the restriction pin 102 supported by the cylinder body 82 is set to be longer than the axial length T2 of the clearance 204 (T1>T2). In this manner, it is possible to ensure the desired support strength of the restriction pin 102 by setting the axial length T1 of the support portion longer than the axial length T2 of the clearance 204 (T1>T2).

Furthermore, in the first embodiment, by forming the reduced diameter portions composed of the first groove portion 202a and the second groove portion 202b, or the recess portion 212 respectively on the outer surface of the restriction pin 102 or the restriction pin 102a, it is possible to separate the outer surfaces of the restriction pins 102, 102a from the inner peripheral wall 83 of the cylinder body 82 via the clearance 204. In this case, since machining for the inner peripheral wall 83 of the cylinder body 82 is not required, it is possible to reduce the manufacturing cost.

Note that, in the first embodiment, by suppressing the load transmission to the cylinder body 82 from the restriction pin 102, it is possible to obtain the vehicle brake system 10 provided with the electric brake device 16 capable of preventing the deformation of the inner peripheral wall 83 (piston sliding surface) of the cylinder body 82. Here, the vehicles include, for example, a four-wheel-drive vehicle (4WD), a front-wheel-drive vehicle (FF), a rear-wheel-drive vehicle (FR), and the like.

Figure 9B:
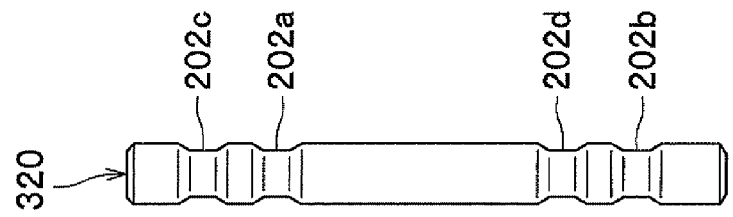
FIG. 9B is a front view of the restriction pin shown in FIG. 9A.
Figure 9A:
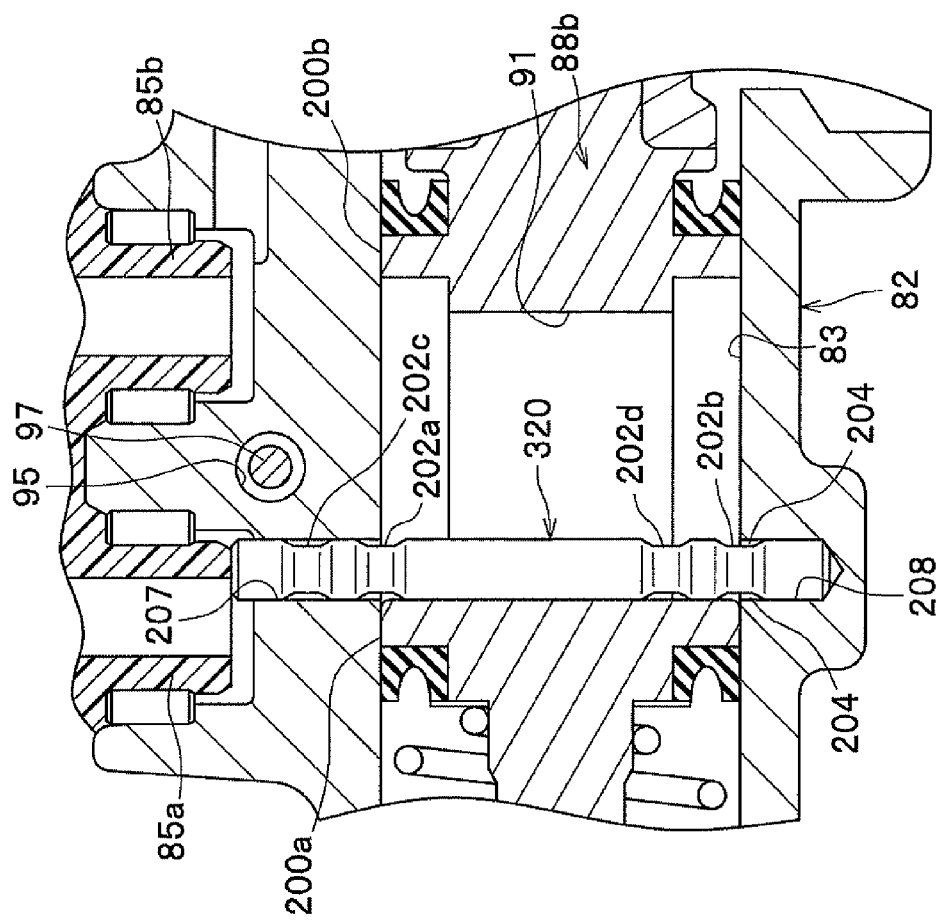
FIG. 9A shows a third example preventing the assembly error of the restriction pin, and is a partially omitted enlarged vertical cross-sectional view showing a state in which the restriction pin is assembled to the cylinder body.

Next, in assembling of the restriction pin to the cylinder body 82, eliminating the assembling direction of the restriction pin to prevent an assembly error will be described below in detail with reference to FIGS. 7A to 9B. FIG. 7A shows a first example preventing the assembly error of the restriction pin, and is a partially omitted enlarged vertical cross-sectional view showing a state in which the restriction pin is assembled to the cylinder body, FIG. 7B is a front view of the restriction pin shown in FIG. 7A, FIG. 8A shows a second example preventing the assembly error of the restriction pin, and is a partially omitted enlarged vertical cross-sectional view showing a state in which the restriction pin is assembled to the cylinder body, FIG. 8B is a front view of the restriction pin shown in FIG. 8A, FIG. 9A shows a third example preventing the assembly error of the restriction pin, and is a partially omitted enlarged vertical cross-sectional view showing a state in which the restriction pin is assembled to the cylinder body, and FIG. 9B is a front view of the restriction pin shown in FIG. 9A.

Excluding a case in which the columnar restriction pin 102b shown in FIG. 6C is used, for example, when the restriction pins 102, 102a shown in FIGS. 4C, 5C are used, since an outer contour of the upper portion side and an outer contour of the lower portion side of the restriction pins 102, 102a are different from each other (in FIG. 4C, a distance to the first groove portion 202a from an upper end surface and a distance to the second groove portion 202b from a lower end surface of the restriction pin 102 are different from each other), assembling directions of the restriction pins 102, 102a are determined, and there is a possibility that the assembly error, in which the restriction pins 102, 102a are assembled by mistake from opposite directions, occurs.

Therefore, in the present invention, it is possible to avoid the assembly error in the following manner. In the first example, as shown in FIG. 7B, a restriction pin 300 formed relatively short in a total length in the axial direction is used. The restriction pin 300 has the outer contour of the upper portion side (a distance D1 to a first groove portion 302a from one end surface in the axial direction) and the outer contour of the lower portion side (a distance D2 to a second groove portion 302b from the other end surface in the axial direction) which are formed symmetrically (D1=D2). In this case, as shown in FIG. 7A, after the restriction pin 300 is inserted and secured to the securing hole 207 on the upper portion side of the cylinder body 82 and the engaging hole 208 on the lower portion side of the cylinder body 82 which are formed in the direction perpendicular to the axial direction of the cylinder body 82, the restriction pin 300 is prevented from slipping out by the connecting leg portion 85a provided on the lower surface of the second reservoir 84 and extended more than a normal length. Incidentally, FIG. 7A shows a state in which the connecting leg portion 85a and the upper end portion of the restriction pin 300 abut against each other (a clearance is zero), but the state is not limited to this, and there may be the clearance between the connecting legs 85a and the upper end portion of the restriction pin 300.

Incidentally, the length of the connecting leg portion 85a of the second reservoir 84 is set to be extended relative to the normal length by an amount corresponding to a reduced amount of overall length of the restriction pin 300. Further, the reservoir port 92b, into which the connecting leg portion 85a of the second reservoir 84 is inserted, is machined to be a deep hole to correspond to the length of the connecting leg portion 85a.

Thus, in the first example, by using the relatively short restriction pin 300 having the outer contours of the upper portion side and lower portion side which are formed symmetrically, and by preventing the head portion of the restriction pin 300 from slipping out by the extended connecting leg portion 85a of the second reservoir 84, it is possible to eliminate a direction of assembly of the restriction pin 300, thereby preventing the assembly error.

In the second example, as shown in FIG. 8B, a restriction pin 310 formed relatively long in a total length in the axial direction is used. The restriction pin 310 has the outer contour of the upper portion side (a distance D1 to a first taper portion 312a from one end surface in the axial direction) and the outer contour of the lower portion side (a distance D2 to a second taper portion 312b from the other end surface in the axial direction) which are formed symmetrically (D1=D2). In this case, as shown in FIG. 8A, by thickening a thickness of a boss portion 314 projecting from the outer peripheral surface of the cylinder body 82, a depth E1 of the engaging hole 208 formed in the boss portion 314 is increased. The increased depth E1 of the engaging hole 208 is set to be substantially equal to the thickness E2 of the upper portion side of the cylinder body 82 formed with the securing hole 207 on the upper portion side (E1 E2).

Thus, in the second example, by using the relatively long restriction pin 310 having the outer contours of the upper portion side and lower portion side which are formed symmetrically, and by increasing the depth E1 of the engaging hole 208, into which the lower portion of the restriction pin 310 is inserted and secured, more than a normal depth so that the depth E1 of the engaging hole 208 is set to be substantially equal to the thickness E2 of the upper portion side of the cylinder body 82 (E1 E2), it is possible to eliminate a direction of assembly of the restriction pin 310, thereby preventing the assembly error.

In addition, by combining the first example with the second example, the connecting leg portion 85a of the second reservoir 84 may be extended by a predetermined length and the depth E1 of the engaging hole 208 formed in the boss portion 314 of the cylinder body 82 may be increased by a predetermined length.

In the third example, the restriction pin having the outer contours of the upper portion side and lower portion side which are asymmetric (a distance to one groove portion from an upper end surface and a distance to the other groove portion from a lower end surface are different from each other) is further groove-machined, so that the restriction pin has the outer contours of the upper portion side and lower portion side which are symmetric.

For example, the restriction pin 102 having the outer contours of the upper portion side and lower portion side which are asymmetric (a distance to the first groove portion 202a from the upper end surface and a distance to the second groove portion 202b from the lower end surface are different from each other) as shown in FIG. 4C is further formed with a third groove portion 202c between the first groove portion 202a and the upper end surface as well as a fourth groove portion 202d on the upper side of the second groove portion 202b.

As a result, as shown in FIG. 9B, the restriction pin 320 further machined is formed with two groove portions composed of the third groove portion 202c and the first groove portion 202a in this order in a downward direction from the upper end surface as well as two groove portions composed of the second groove portion 202b and the fourth groove portion 202d in this order in an upward direction from the lower end surface.

In this case, as shown in FIG. 9B, a distance from the upper end surface to the first groove portion 202a is set to be equal to a distance from the lower end surface to the fourth groove portion 202d (further machined), and a distance from the upper end surface to the third groove portion 202c (further machined) is set to be equal to a distance from the lower end surface to the second groove portion 202b.

Thus, in the third example, by further groove-machining the restriction pin 102 of asymmetrical contour with the upper portion side and lower portion side, it is possible to make the restriction pin 102 of symmetrical contour with the upper portion side and lower portion side. For example, by forming the first to fourth groove portions 202a to 202d on a normal restriction pin of columnar shape continuously at one time in advance, it is also possible to make the restriction pin 320 of symmetrical contour with the upper portion side and lower portion side.

<Second Embodiment>

Next, a second embodiment of the present invention will be described. The components common to the first embodiment are denoted by the same reference numerals, and the descriptions and configurations shown in the first embodiment are assumed to be incorporated.

Figure 10:
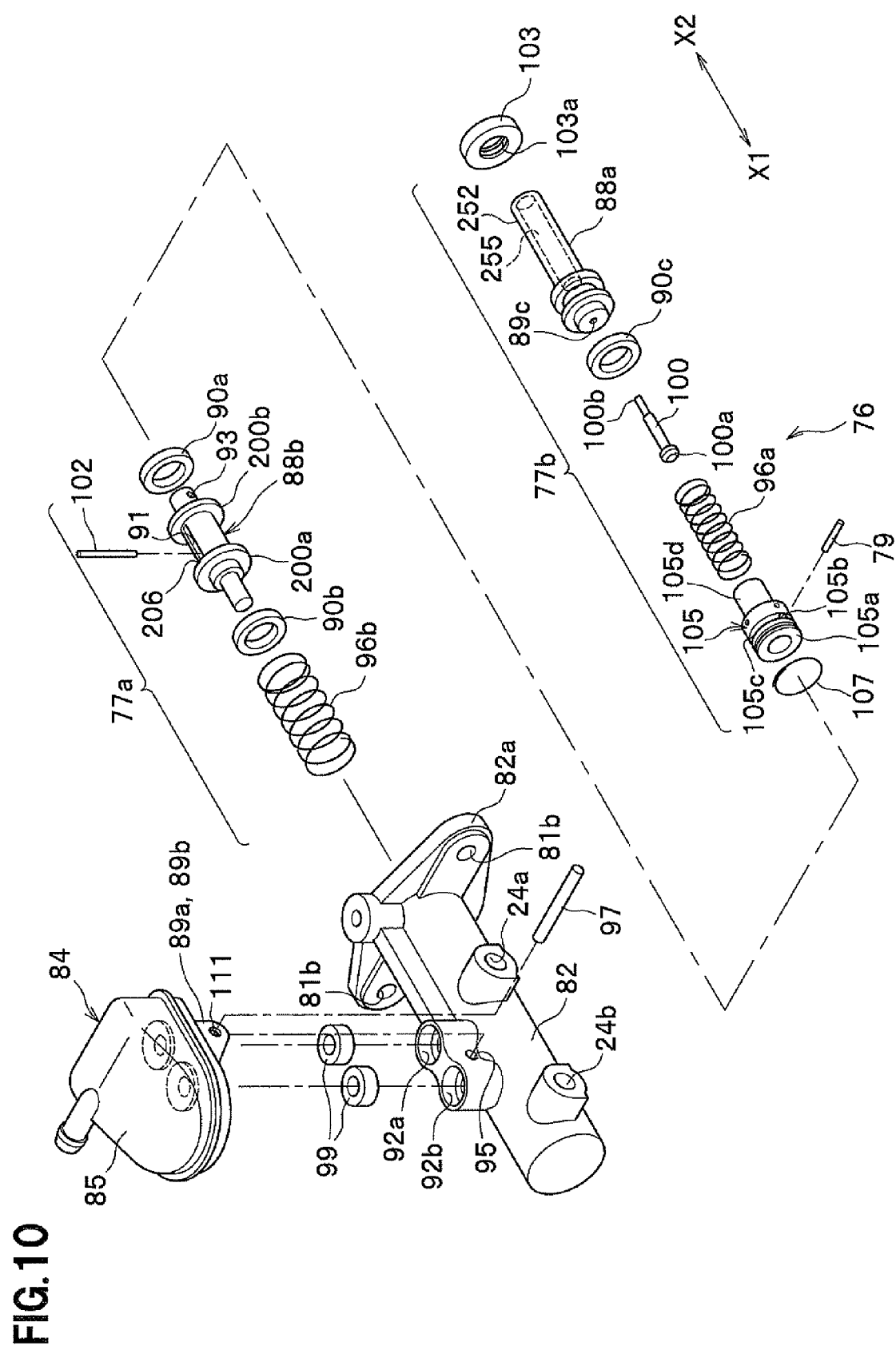
FIG. 10 is an exploded perspective view of a cylinder mechanism according to a second embodiment of the present invention.
Figure 11A:
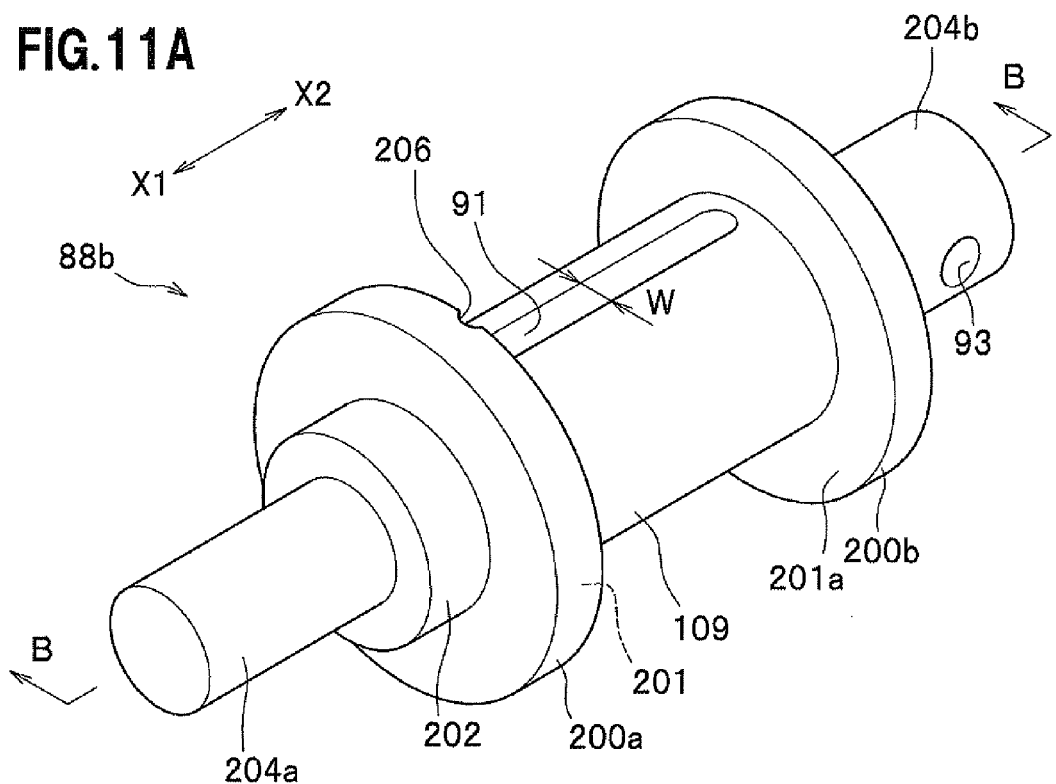
FIG. 11A is an enlarged perspective view of the first slave piston.
Figure 11B:
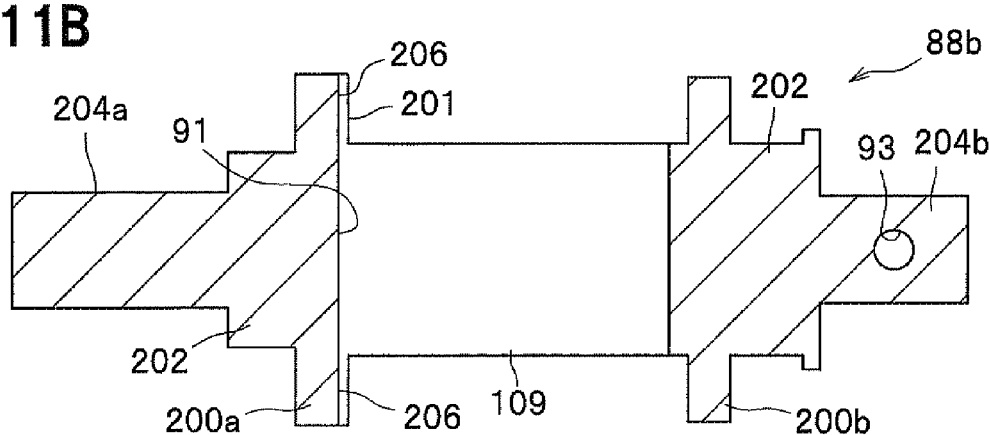
FIG. 11B is a vertical cross-sectional view of the first slave piston along with a line B-B in FIG. 11A.
Figure 11C:
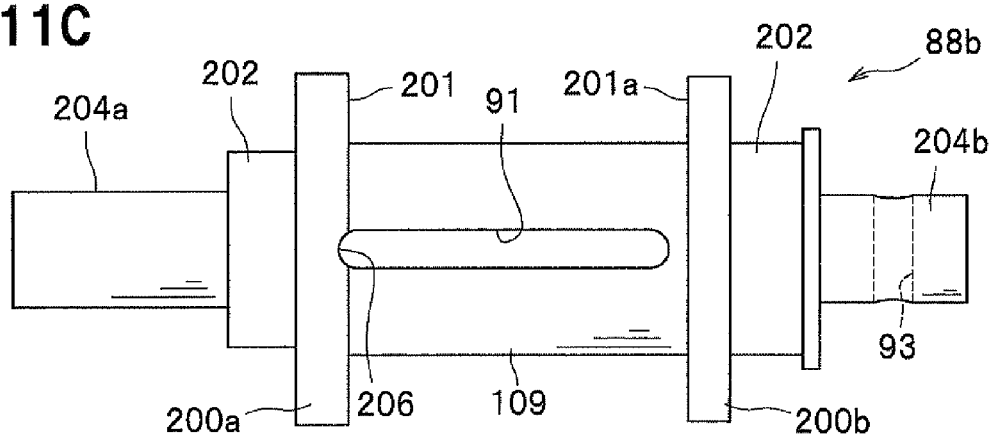
FIG. 11C is a top view of the first slave piston shown in FIG. 11A.
Figure 12:
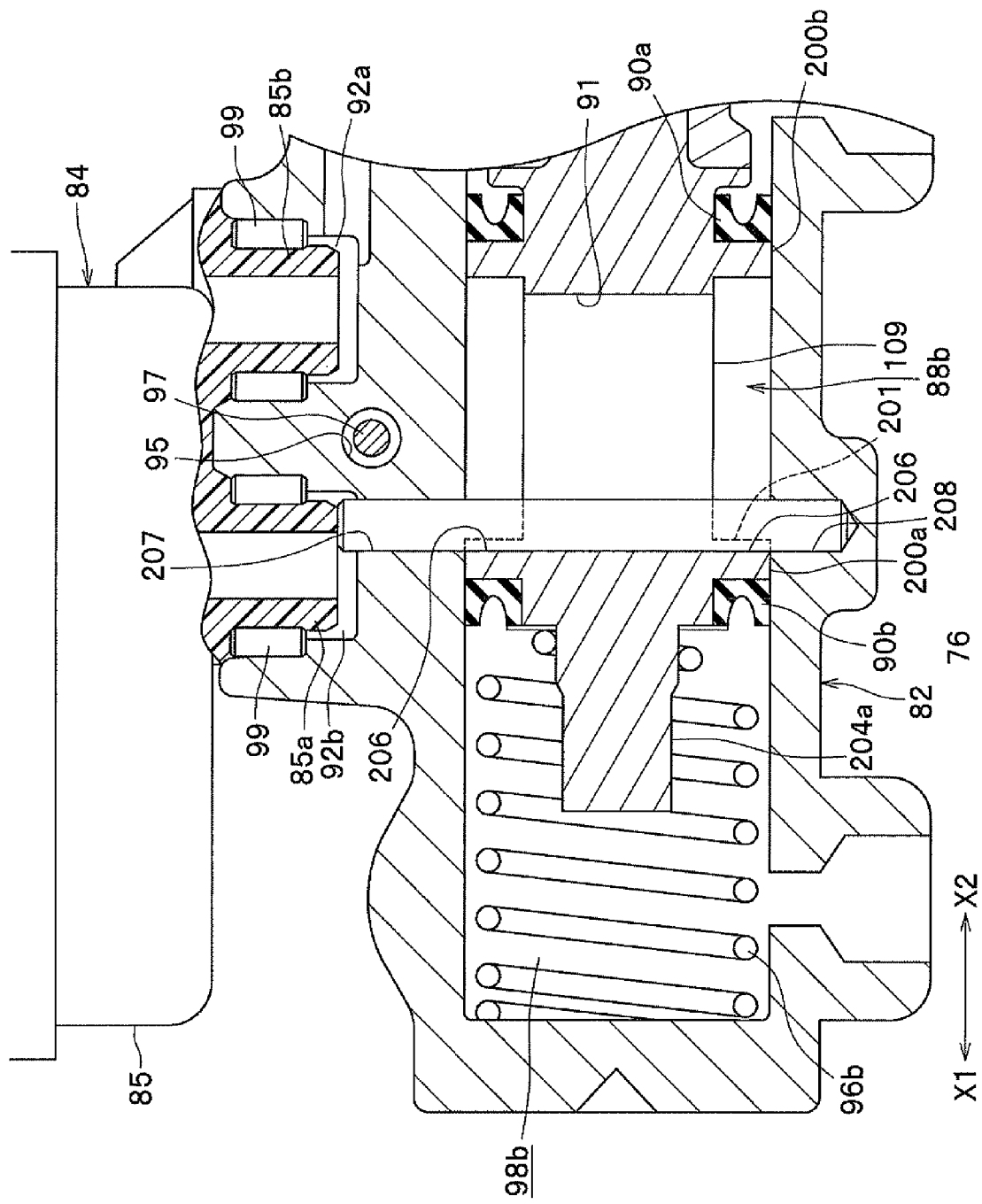
FIG. 12 is a partially enlarged vertical cross-sectional view showing a state in which the first slave piston accommodated in the cylinder body is restricted at a backward position by the restriction pin.

FIG. 10 is an exploded perspective view of a cylinder mechanism according to a second embodiment of the present invention, FIG. 11A is an enlarged perspective view of the first slave piston shown in FIG. 10, FIG. 11B is a vertical cross-sectional view of the first slave piston along with a line B-B in FIG. 11A, FIG. 11C is a top view of the first slave piston shown in FIG. 11A, and FIG. 12 is a partially enlarged vertical cross-sectional view showing a state in which the first slave piston accommodated in the cylinder body is restricted at a backward position by the restriction pin.

The first piston mechanism 77a includes the first slave piston 88b which is disposed to face a first hydraulic chamber 98b in front of the cylinder body 82 having a bottomed cylindrical shape, a restriction pin (restriction unit) 102 which is secured to the cylinder body 82 and restricts a movement range of the first slave piston 88b by abutting against abutting portions (restriction portions) 206 to be described later, a pair of cup seals 90a, 90b which is mounted on annular step portions 202 of the first slave piston 88b, and a first spring (elastic member) 96b which is disposed between the first slave piston 88b and a side end portion (bottom wall) of the cylinder body 82 and pushes the first slave piston 88b toward the backward (arrow X2).

The restriction pin 102 is adapted to function as the restriction unit which restricts the backward position of the first slave piston 88b, for example, when the hydraulic pressure derived from the first pressure chamber 56b of the master cylinder 34 (outside) is applied to the first hydraulic chamber (output hydraulic chamber) 98b. One end portion of the first spring 96b is supported by the first flange portion 200a including the annular step portion 202, while the other end portion of the first spring 96b is supported by the bottom wall of the cylinder body 82.

As shown in FIG. 11, the first slave piston 88b has the piston body 109, and is formed with, in the front and rear of the piston body 109, an annular pair of first flange portion 200a and second flange portion 200b which is separated by a predetermined distance, the annular step portions 202 continuous with the first flange portion 200a or the second flange portion 200b, and a front shaft portion 204a and a rear shaft portion 204b which are made of columnar bodies continuous with the annular step portions 202, and extend in the axial direction by a predetermined length.

Between the first flange portion 200a and the second flange portion 200b, a through hole 91 penetrating in a direction perpendicular to the axial direction of the first slave piston 88b is formed, and the restriction pin 102 is inserted into the through hole 91 from a direction perpendicular to the axial direction of the cylinder body 82 as will be described later. In addition, the dimension of an opening width W (see FIG. 11A) of the through hole 91 in the direction perpendicular to the axial direction of the piston body 109 is set slightly larger than the outer diameter of the restriction pin 102.

As shown in FIG. 11B, the through hole 91 is formed so as to extend from a rear surface 201 of the first flange portion 200a of the front shaft portion 204a side to a position which does not reach an opposing surface 201a of the second flange portion 200b in the axial direction of the first slave piston 88b.

The abutting portion 206, which abuts against the restriction pin 102 at the backward position (backward stroke end) of the first slave piston 88b, is formed on the rear surface 201 of the first flange portion 200a. The abutting portion 206 is made of a groove portion of an arc shape in a plan view (see FIG. 11A), and is provided so as to extend continuously with the through hole 91 in a direction perpendicular to the axial direction of the piston body 109 (see FIG. 11C).

Incidentally, a displacement end position (forward stroke end) in the forward side of the second slave piston 88b is restricted by a tip end reduced diameter portion in the axial direction of the first slave piston 88b abutting against a bottom portion (inner wall) of the cylinder body 82.

In this case, since the abutting portion 206 is made of a groove portion of arc-shaped cross section and the groove portion is formed continuously with the through hole 91, the restriction pin 102 abuts against the groove portion and the through hole 91 in a state of surface contact.

Since the abutting portion 206, which abuts against the restriction pin 102 secured to the cylinder body 82, is formed on the rear surface 201 of the first flange portion 200a, the abutting portion 206 is provided on the outer peripheral side of the first slave piston 88b than the piston body 109.

Note that, as shown in FIG. 11B, the abutting portions 206 are formed respectively on the upper side and lower side of the rear surface 201 of the first flange portion 200a, and the abutting surface against the restriction pin 102 is configured to include the through hole 91.

When the restriction pin 102 is assembled to the cylinder body 82, the restriction pin 102 is inserted from the opening portion of the reservoir port 92b, and the upper end portion and the lower portion of the restriction pin 102 are respectively locked by the securing hole 207 and the engaging hole 208 which are formed in a direction perpendicular to the axial direction of the cylinder body 82 (see FIG. 12). Further, the upper end portion of the restriction pin 102 is prevented from slipping out by abutting against the connecting leg portion 85a provided on the lower surface of the reservoir body 85 of the second reservoir 84. Note that, FIG. 12 shows a state in which the connecting leg portion 85a abuts against the upper end portion of the restriction pin 102, however, the restriction pin 102 is prevented from slipping out even if a clearance is provided between the connecting leg portion 85a and the upper end portion of the restriction pin 102.

On the rear shaft portion 204b of the first slave piston 88b, an insertion hole 93, through which the coupling pin 79 is inserted in a state where a cylindrical portion 105a of a coupling piston 105 to be described later is fitted onto the first slave piston 88b, is formed.

As shown in FIG. 10, the second piston mechanism 77b includes the second slave piston 88a disposed so as to face a second hydraulic chamber 98a behind (in the arrow X2 direction of) the first slave piston 88b, a piston guide 103 which seals an outer peripheral surface of a rod portion 252 in the rear of the second slave piston 88a and guides the second slave piston 88a in a straight line, a cup seal 90c mounted on a shaft portion in front of the second slave piston 88a, and a second spring 96a which is disposed between the first slave piston 88b and the second slave piston 88a, and urges the first slave piston 88b and the second slave piston 88a in a direction separating them from each other.

In the second embodiment, the restriction pin 102 for restricting the backward movement of the first slave piston 88b is provided so as to ensure a minimum brake hydraulic pressure in the wheel cylinders 32FR, 32RL, 32RR, 32FL, for example, when the hydraulic pressure derived from the first pressure chamber 56b of the master cylinder 34 (outside) is applied to the first hydraulic chamber (output hydraulic chamber) 98b of the electric brake device 16.

Therefore, in the second embodiment, by providing the abutting portion 206 which abuts against the restriction pin 102 on the outer peripheral side of the piston body 109 of the first slave piston 88b, it is possible to increase an area of the abutting surface of the restriction pin 102 compared with a case, for example, where only an unillustrated through hole which does not reach the first flange portion 200a is formed in the piston body 109 and the restriction pin 102 abuts against the inside of the through hole, thereby suppressing a bending moment for the restriction pin 102. As a result, in the second embodiment, it is possible not only to prevent a deformation of the restriction pin 102 which is locked by the securing hole 207 and the engaging hole 208 of the cylinder body 82 but also to avoid a deformation of the cylinder body 82 which locks the restriction pin 102.

In the second embodiment, since the bending moment for the restriction pin 102 is suppressed, it is possible to suppress a torsional action or an inclination action of the first slave piston 88b which is slidably displaced in the cylinder body 82.

Furthermore, in the second embodiment, the abutting portion 206 is formed on the rear surface 201 of the first flange portion 200a which supports the first spring 96b urging the first slave piston 88b in the backward direction, it is possible to prevent a spring load applied via the first spring 96b from acting in a direction of rotation of the first slave piston 88b. In this case, since the outer diameter of the annular first flange portion 200a projecting radially outward of the piston body 109 becomes an effective diameter of the first slave piston 88b, it is possible to stably support the outer diameter side of the first spring 96b by utilizing the effective diameter of the first slave piston 88b.

Furthermore, in the second embodiment, since the abutting portion 206 is made of a groove portion of arc-shaped cross section corresponding to the outer diameter surface of the restriction pin 102, and the groove portion abuts against the restriction pin 102 in a state of surface contact, it is possible to reduce a load by reducing a surface pressure when the groove portion abuts against the regulation pin 102.

In the second embodiment, it is possible to obtain the vehicle brake system 10 provided with the electric brake device 16 capable of reducing the bending moment acting on the restriction pin 102. Here, the vehicles include, for example, a four-wheel-drive vehicle (4WD), a front-wheel-drive vehicle (FF), a rear-wheel-drive vehicle (FR), and the like.

<Third Embodiment>

Next, a third embodiment of the present invention will be described. The components common to the first embodiment are denoted by the same reference numerals, and the descriptions and configurations shown in the first embodiment are assumed to be incorporated.

Figure 13:
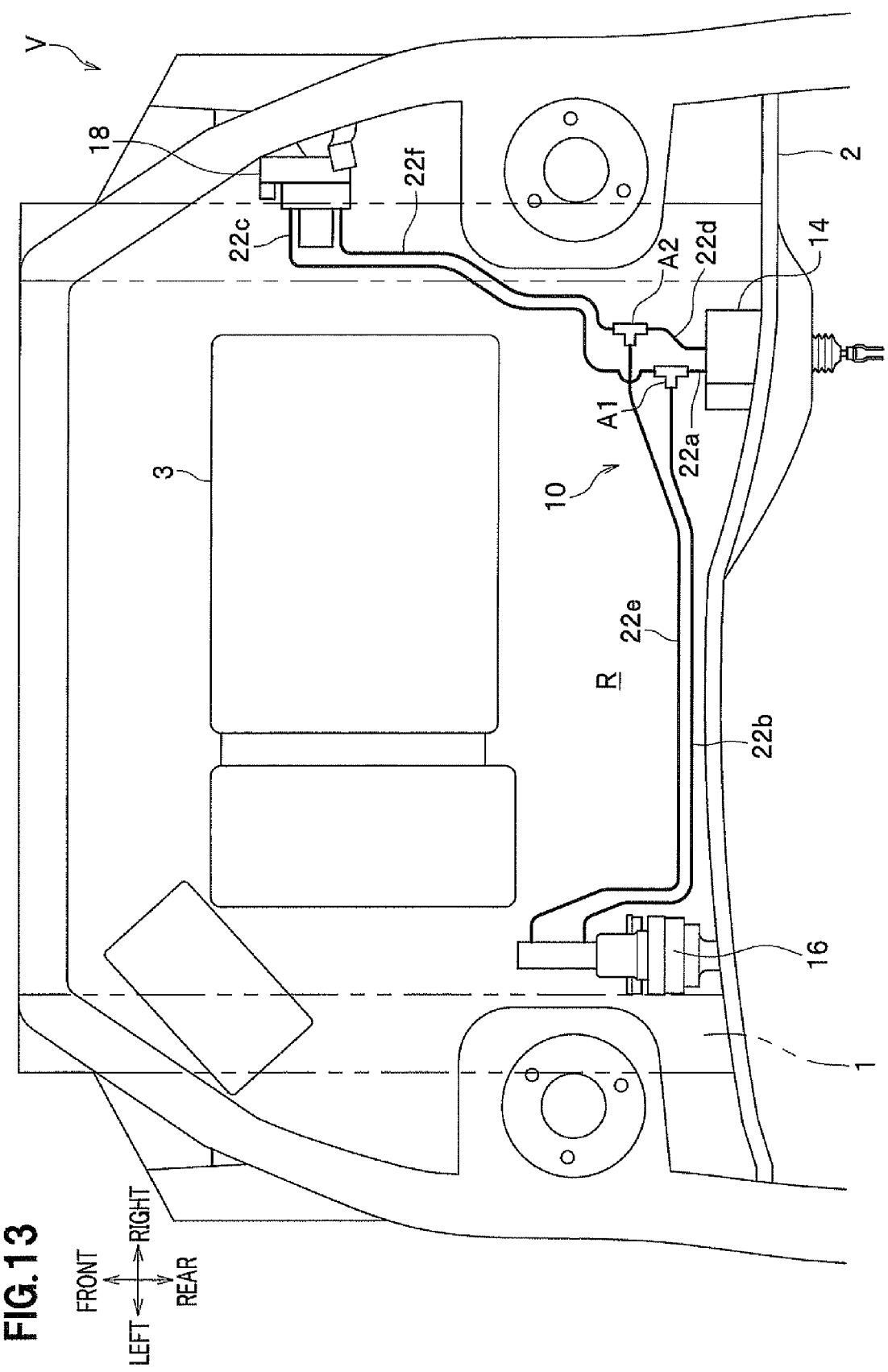
FIG. 13 is a diagram showing an arrangement in a vehicle equipped with a vehicle brake system applied with an electric brake device according to a third embodiment of the present invention.
Figure 14:
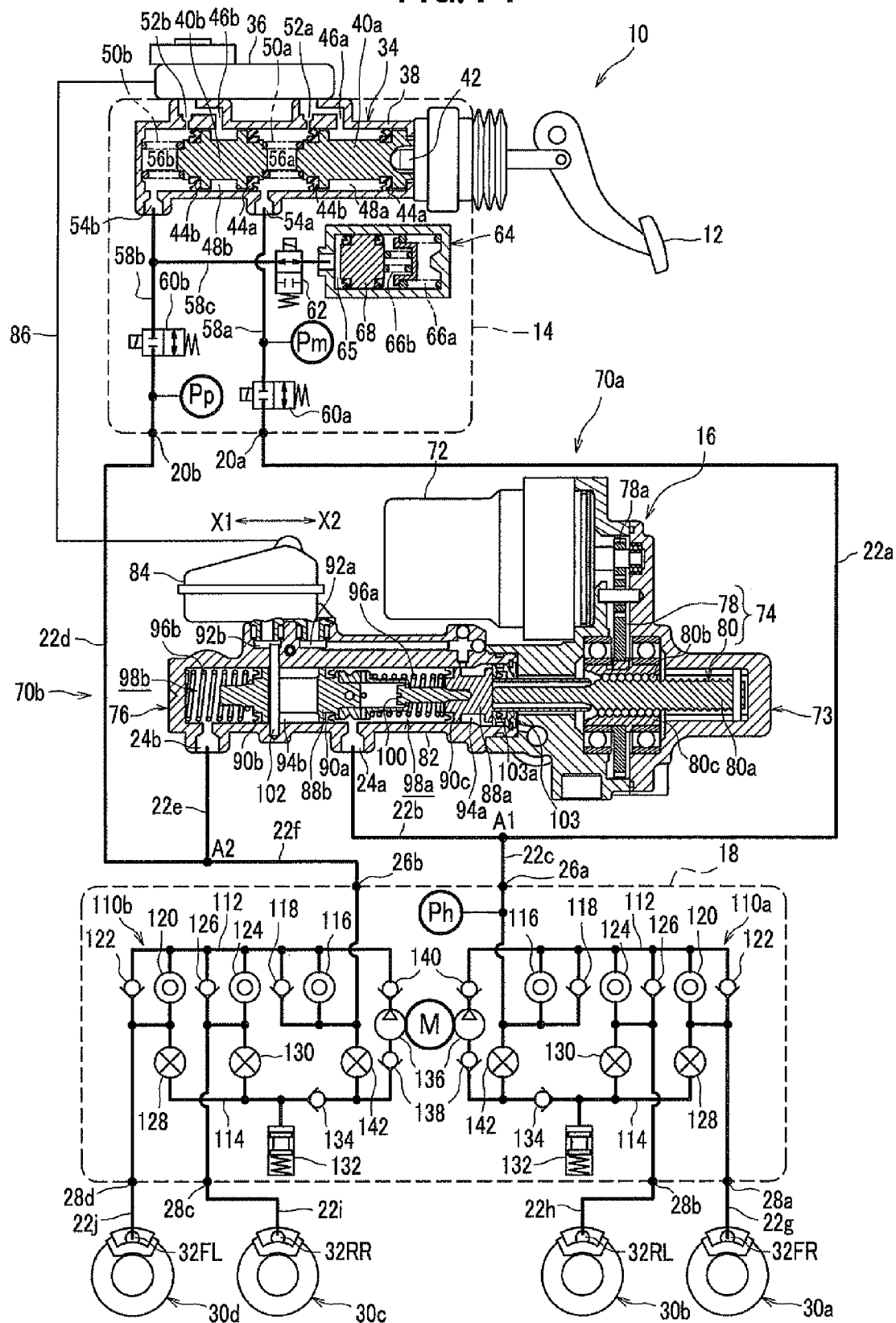
FIG. 14 is a schematic block diagram of a vehicle brake system.

FIG. 13 is a diagram showing an arrangement in a vehicle equipped with a vehicle brake system applied with an electric brake device according to a third embodiment of the present invention. FIG. 14 is a schematic block diagram of a vehicle brake system. In addition, directions of the front, rear, left, and right of a vehicle V are shown by arrows in FIG. 13.

The vehicle brake system according to the third embodiment of the present invention is configured to include both of a brake-by-wire type brake system and a conventional hydraulic type brake system. The brake-by-wire type brake system operates a brake by transmitting an electrical signal as for normal time, and the conventional hydraulic type brake system operates the brake by transmitting hydraulic pressure as for fail-safe time.

As shown in FIG. 1, the vehicle brake system 10 is configured to include the input device 14 into which a brake operation by an operator (driver) is inputted, a motor cylinder device 16 as the electric brake system for generating the brake hydraulic pressure at least on the basis of the electrical signal in accordance with the brake operation, and a vehicle stability assist device 18 (hereinafter referred to as a VSA device 18, VSA; registered trademark) as a vehicle behavior stabilization device for assisting a stabilization of a vehicle behavior on the basis of the brake hydraulic pressure generated by the motor cylinder device 16.

The motor cylinder device 16 may be configured to generate the brake hydraulic pressure on the basis of an electrical signal in accordance with another physical quantity, in addition to the electrical signal in accordance with the brake operation by the driver. The electrical signal according to another physical quantity is, for example, a signal for avoiding a collision or the like of the vehicle V not by the brake operation by the driver but by an ECU (Electronic Control Unit) determining a situation in the vicinity of the vehicle V by a sensor or the like, as an automatic brake system.

Here, the input device 14 is adapted to be applied to a right-hand drive vehicle, and is secured to the right of the vehicle width direction of a dashboard 2 by bolts or the like. Note that, the input device 14 can be one that is applied to a left-hand drive vehicle. The motor cylinder device 16 is disposed, for example, on the left side in the vehicle width direction on the opposite side of the input device 14, and mounted on a left side frame or the like of a vehicle body 1 via a mounting bracket (not shown). The VSA device 18 is configured to include, for example, an ABS (Antilock Brake System) function to prevent wheel lock during braking, a TCS (Traction Control System) function to prevent wheel slip during acceleration or the like, and a function to suppress side slip during turning, and is mounted on the vehicle body 1 via a bracket, for example, on the front end of the right side in the vehicle width direction. In place of the VSA device 18, the ABS device having only the ABS function to prevent wheel lock during braking may be mounted on the vehicle body 1. The detailed structures in the input device 14, the motor cylinder device 16, and the VSA unit 18 will be described later.

The input device 14, the motor cylinder device 16, and the VSA device 18 are arranged separated from each other via piping tubes 22a to 22f in a structure mounting chamber R in which structures 3 such as an engine, a traction motor, provided in front of the dashboard 2 of the vehicle V are mounted. Note that, the vehicle brake system 10 is applicable to any of a front-wheel-drive vehicle, a rear-wheel-drive vehicle, and a four-wheel-drive vehicle. Further, as the brake system by-wire type, the input device 14 and the motor cylinder device 16 are electrically connected to a control unit such as an ECU by an unillustrated wire harness.

The description of hydraulic paths in FIG. 14 is omitted because they are the same as the first embodiment.

The motor cylinder device 16 is the electric brake device which generates the brake hydraulic pressure by driving the second slave piston 88a and the first slave piston 88b in the axial direction by the driving force of the electric motor 72. Incidentally, in the motor cylinder device 16, the moving direction (arrow X1 direction in FIG. 14) of the second slave piston 88a and the first slave piston 88b when the brake hydraulic pressure is generated (increased) is defined as "forward", and the opposite direction (arrow X2 direction in FIG. 14) is defined as "backward".

The motor cylinder device 16 includes a cylinder portion (cylinder mechanism) 76 for accommodating the first slave piston 88b and the second slave piston 88a which are movable in the axial direction, the motor 72 for driving the first slave piston 88b and the second slave piston 88a, and the driving force transmission unit 73 for transmitting the driving force of the motor 72 to the first slave piston 88b and the second slave piston 88a.

The driving force transmission unit 73 has a driving force transmission mechanism (actuator mechanism) 74 which includes the gear mechanism (deceleration mechanism) 78 for transmitting the rotational driving force of the motor 72 and the ball screw structure 80 for converting the rotational driving force to a linear direction driving force in the axial direction of the ball screw shaft 80a engaged with a nut 80c via balls 80b by the nut 80c receiving the rotational driving force.

The cylinder portion 76 has a substantially cylindrical cylinder body 82 and a second reservoir 84 attached to the cylinder body 82. The second reservoir 84 is provided to be connected to the first reservoir 36 attached to the master cylinder 34 of the input device 14 by a piping tube 86, so that the brake fluid reserved in the first reservoir 36 is supplied into the second reservoir 84 via the piping tube 86.

In the cylinder body 82, the second slave piston 88a and the first slave piston 88b, which are spaced from each other by a predetermined distance in the axial direction of the cylinder body 82, are disposed slidably. The second slave piston 88a is disposed in close proximity to the side of the ball screw structure 80, and abuts against a tip end 240 (see FIG. 19) of the ball screw shaft 80a to be displaced integrally with the ball screw shaft 80a in the direction of the arrow X1 or the arrow X2. The first slave piston 88b is disposed apart from the ball screw structure 80 side compared to the second slave piston 88a.

The annular piston guide (guide portion) 103, which seals liquid-tightly a gap between the driving force transmission mechanism 74 and the outer peripheral surface of the second slave piston 88a, and guides the second slave piston 88a movably in the axial direction, is disposed so as to face the outer peripheral surface of the second slave piston 88a. A cup seal 103a is mounted on the inner peripheral surface of the piston guide 103. Further, on the outer peripheral surface of the front end side of the second slave piston 88a, a slave cup seal 90c is mounted via an annular step portion. Between the slave cup seal 90c and the cup seal 103a, a second back chamber 94a which communicates with the reservoir port 92a to be described later is formed. Then, between the first slave piston 88b and a second slave piston 88a, a second return spring 96a is disposed.

Meanwhile, a pair of slave cup seals 90a, 90b is respectively mounted on the outer peripheral surface of the first slave piston 88b through the annular step portions. Between the pair of slave cup seals 90a, 90b, the first back chamber 94b which communicates with the reservoir port 92b to be described later is formed. Then, between the front end portion of the cylinder body 82 and the first slave piston 88b, a first return spring 96b is disposed.

The cylinder body 82 of the cylinder portion 76 is provided with the two reservoir ports 92a, 92b and the two output ports 24a, 24b. In this case, the reservoir ports 92a, 92b are provided to communicate with a reservoir chamber in the second reservoir 84.

In addition, a second hydraulic pressure chamber 98a and a first hydraulic pressure chamber 98b are provided in the cylinder body 82. The second hydraulic pressure chamber 98a generates the brake hydraulic pressure which is outputted from the output port 24a to the side of the wheel cylinders 32FR, 32RL, and the first hydraulic pressure chamber 98b generates the brake hydraulic pressure which is outputted from the other output port 24b to the side of the wheel cylinders 32RR, 32FL.

In addition, between the first slave piston 88b and the second slave piston 88a, a restriction unit 100 for restricting a minimum distance and a maximum distance between the first slave piston 88b and the second slave piston 88a is provided. Further, on the first slave piston 88b, a stopper pin 102 for restricting a sliding range of the first slave piston 88b to prevent over-return to the second slave piston 88a side is provided. In this manner, when one system fails, a failure in the other system is prevented, particularly during a backup time when braking by the brake hydraulic pressure generated in the master cylinder 34.

Since the VSA device 18 is well known and the same as the first embodiment, the description will be omitted. Further, since the basic operational effects of the vehicle brake system 10 according to the third embodiment is also the same as the first embodiment, the description will be omitted.

Figure 15:
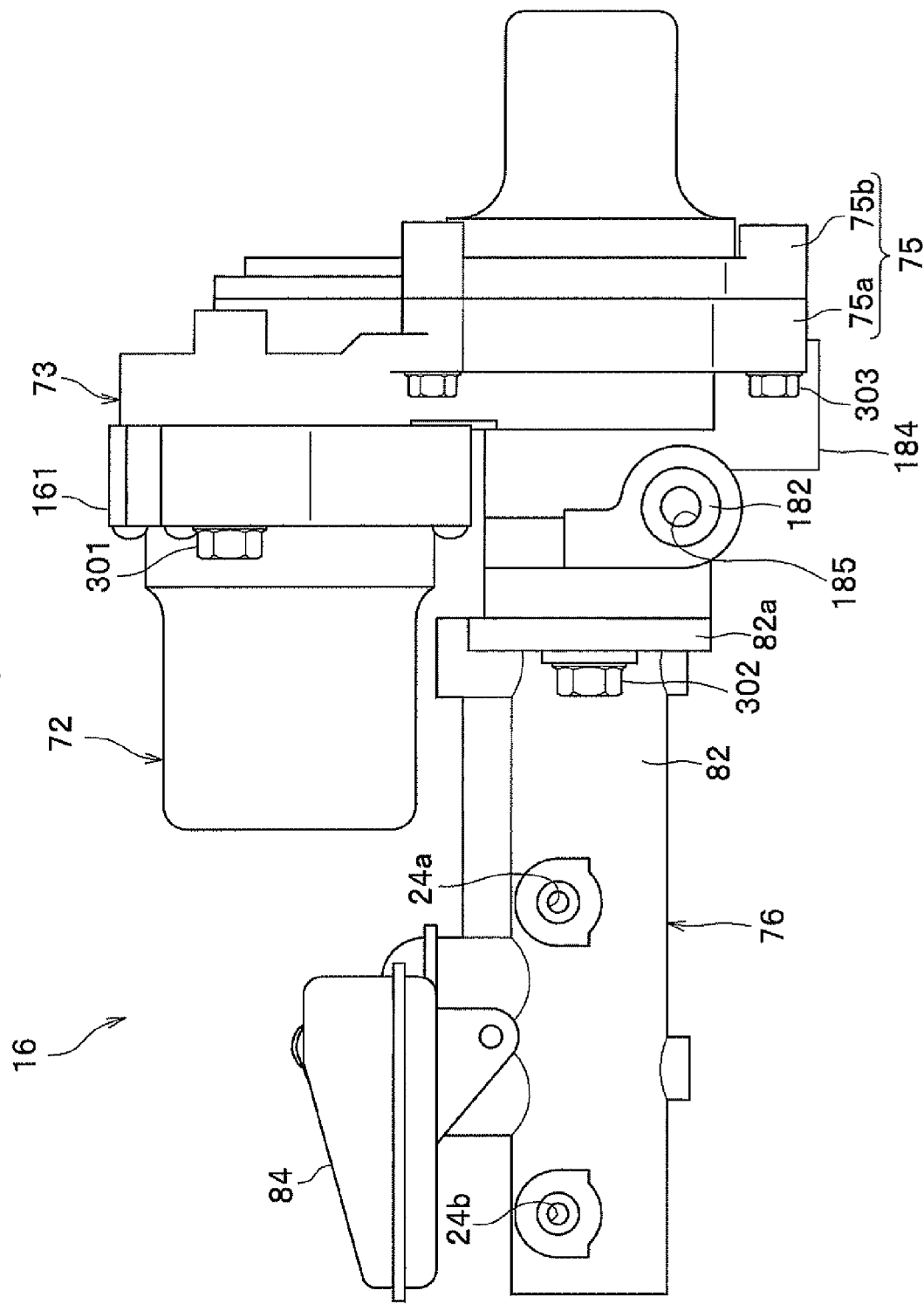
FIG. 15 is a side view of a motor cylinder device.
Figure 16:
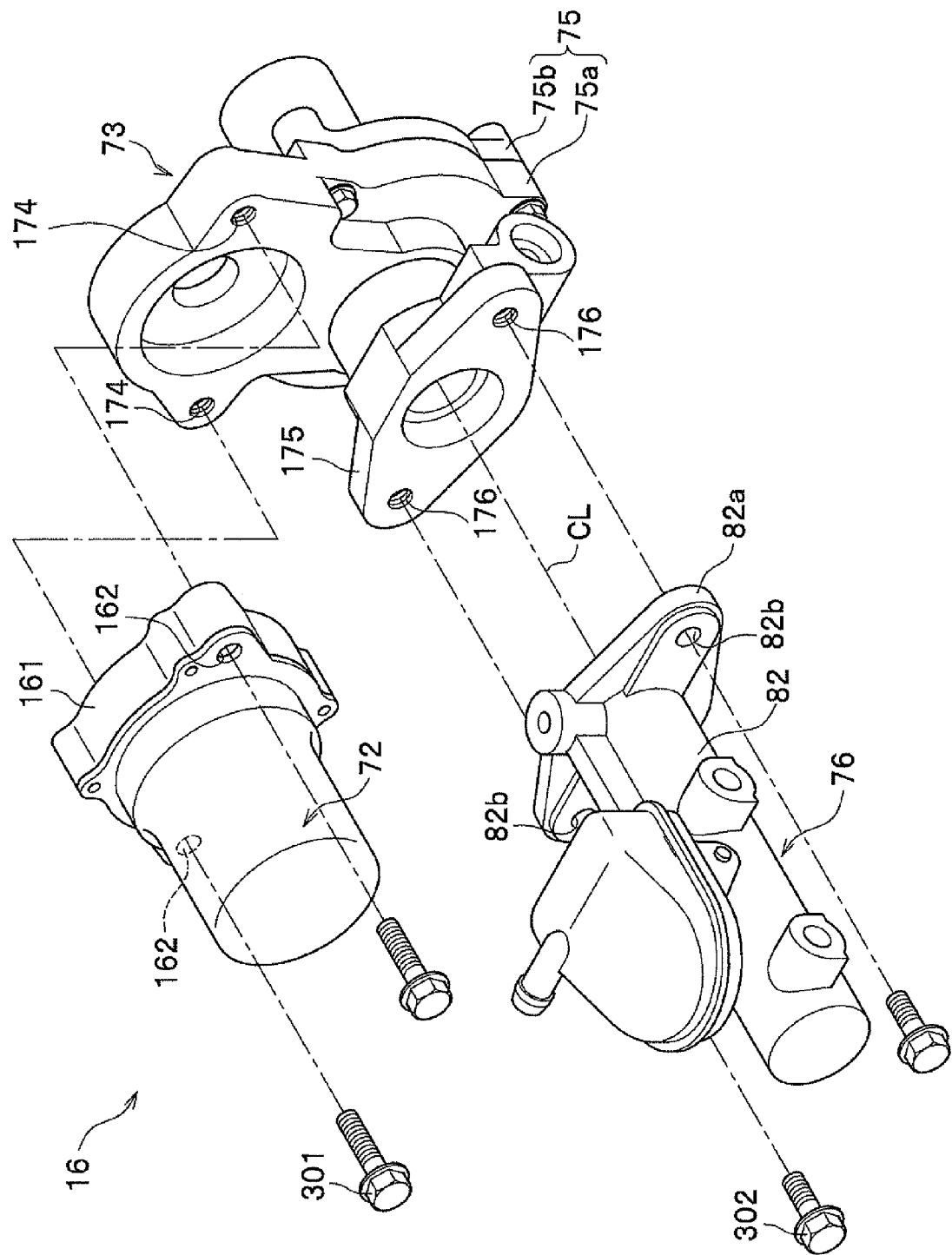
FIG. 16 is an exploded perspective view of the motor cylinder device.
Figure 17:
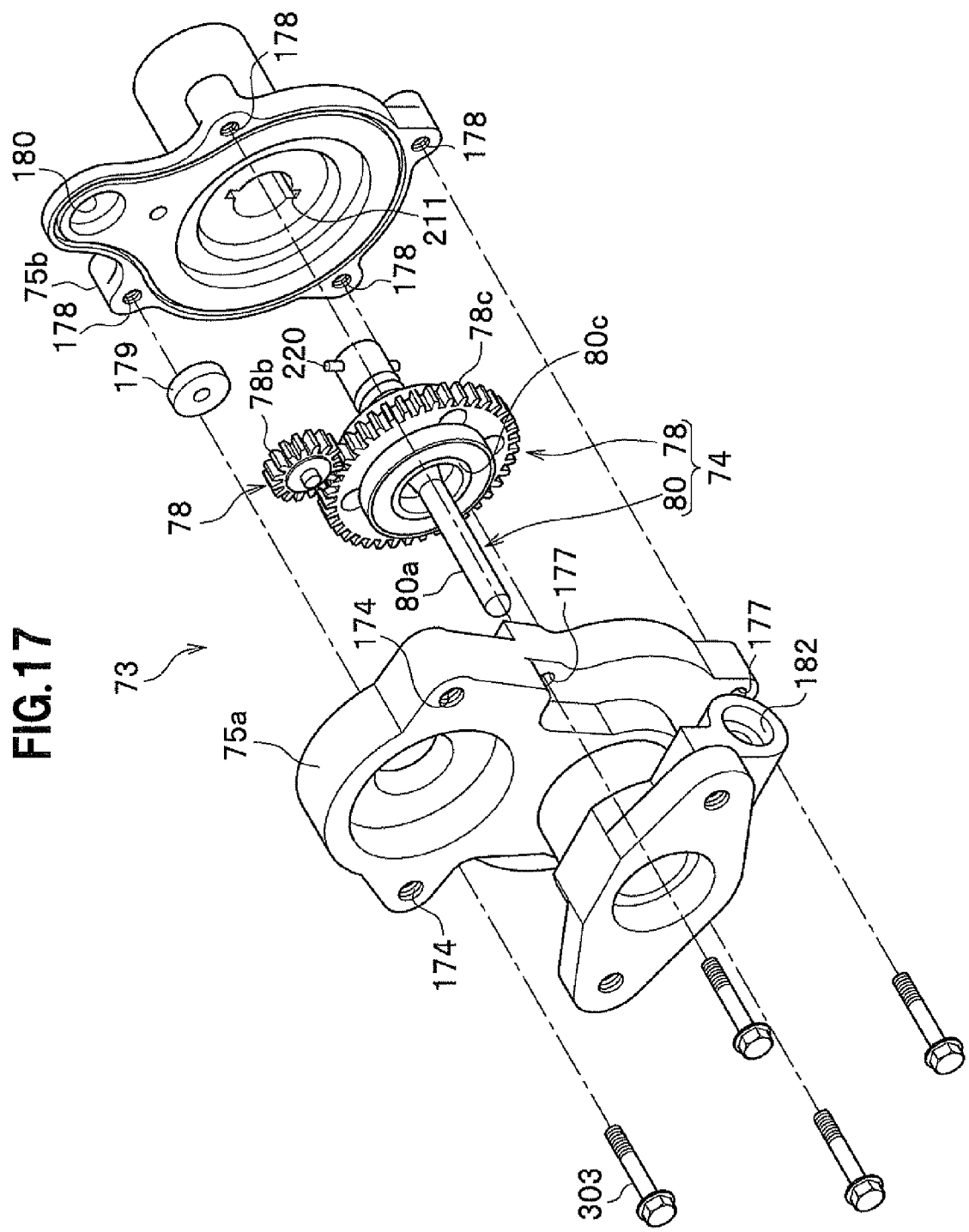
FIG. 17 is an exploded perspective view of a driving force transmission unit.

Next, the motor cylinder device 16 will be described in more detail. FIG. 15 is a side view of a motor cylinder device. FIG. 16 is an exploded perspective view of the motor cylinder device. FIG. 17 is an exploded perspective view of a driving force transmission unit.

As shown in FIG. 15, the motor cylinder device 16 includes the cylinder portion 76, the motor 72, and the driving force transmission unit 73 as described before. The motor is driven on the basis of electrical signals from an unillustrated control unit.

Here, the motor 72 is positioned above the cylinder portion 76. With this configuration, it is possible to prevent oil components such as grease in the driving force transmission unit 73 from entering unillustrated electrical components or the like in the motor 72 by the action of gravity.

As shown in FIG. 16, the motor 72, the driving force transmission unit 73, and the cylinder portion 76 are configured to be separable from each other. The motor 72 includes a base portion 161 to which an unillustrated wire harness is connected, and the base portion 161 is formed with a plurality of through holes 162 through which volts (screw members) 301 are inserted. Further, the cylinder body 82 of the cylinder portion 76 includes a flange portion 82a at the end portion thereof on the side of the driving force transmission unit 73, and the flange portion 82a is provided with a plurality of through holes 82b through which bolts (screw members) 302 are inserted.

The driving force transmission unit 73 includes the housing (actuator housing) 75 accommodating therein the driving force transmission mechanism 74 (see FIG. 17) including the gear mechanism 78 and the ball screw structure 80, and the housing 75 includes a case (first body) 75a which is disposed on the cylinder mechanism 76 side, and a cover (second body) 75b which covers an open end of the first body 75a opposite to the cylinder mechanism 76. The case 75a and the cover 75b of the driving force transmission unit 73 are formed from a light metal such as an aluminum alloy (the cylinder body 82 of the cylinder portion 76 is as well).

The case 75a of the driving force transmission unit 73 is formed with a plurality of motor mounting screw holes 174 for mounting the motor 72 on the driving force transmission unit 73. Further, the end portion of the cylinder portion 76 side of the case 75a is provided with the flange portion 175, and the flange portion 175 is formed with a plurality of cylinder portion mounting screw holes 176 for mounting the cylinder portion 76 on the driving force transmission unit 73.

Then, by inserting the bolts 301 through the through holes 162 and screwing the bolts 301 into the motor mounting screw holes 174, the motor 72 is fixedly attached to the driving force transmission unit 73. Further, by inserting the bolts 302 through the through holes 82b and screwing the bolts 302 into the cylinder portion mounting screw holes 176, the cylinder portion 76 is fixedly attached to the driving force transmission unit 73.

As shown in FIG. 17, the gear mechanism 78 and the ball screw structure 80 are accommodated in the housing 75 (see FIG. 16). The gear mechanism 78 includes a pinion gear 78a (see FIG. 14) which is fixed to the output shaft of the motor 72, an idle gear 78b which is meshed with the pinion gear 78a, and a ring gear 78c which is meshed with the idle gear 78b.

The ball screw structure 80 includes the nut 80c which rotates by receiving the rotational driving force of the motor 72, the ball screw shaft 80a (screw) which is provided movably in the axial direction and engaged (screwed) with the nut 80c while the tip end 240 (see FIG. 19) thereof abuts against to press the second slave piston 88a (piston), and the balls 80b (see FIG. 14) which are disposed rotatably in thread grooves of the ball screw shaft 80a.

Then, the nut 80c is engaged with the inner peripheral surface of the ring gear 78c, for example, via a key. However, the engagement of the ring gear 78c with the nut 80c is not limited to the engagement via the key, and the outer peripheral surface of the nut 80c may be press-fitted to the inner peripheral surface of the ring gear 78c, for example. Thus, the rotational driving force transmitted from the gear mechanism 78 is converted to the linear direction driving force by the ball screw structure 80 after being inputted to the nut 80c, and the ball screw shaft 80a is adapted to be movable in the axial direction.

The case 75a and the cover 75b of the housing 75 (see FIG. 16) are configured to be separable from each other. The case 75a is formed with a plurality of through holes 177 through which bolts 303 are inserted, so as to be located around the center axis CL (see FIG. 16) of the first slave piston 88b and the second slave piston 88a (see FIG. 14), and the cover 75b is formed with a plurality of case mounting screw holes 178 at positions corresponding to the through holes 177. Then, by inserting the bolts 303 through the through holes 177 and screwing the bolts 303 into the case mounting screw holes 178, the case 75a and the cover 75b are coupled to each other.

Reference numeral 179 in FIG. 17 indicates a bearing which rotatably supports the tip end of the output shaft of the motor 72, and the bearing 179 is fitted into the hole portion 180 formed in the cover 75b. Further, columnar pins 220 as restriction portions for preventing rotation of the ball screw shaft 80a are provided to the ball screw shaft 80a, for example, by being pressed into through holes formed in a direction perpendicular to the axial direction of the ball screw shaft 80a. Meanwhile, the cover 75b of the housing 75 is formed with sliding grooves 211 as guide portions for supporting the pins 220 movably in the axial direction of the ball screw shaft 80a.

Figure 18:
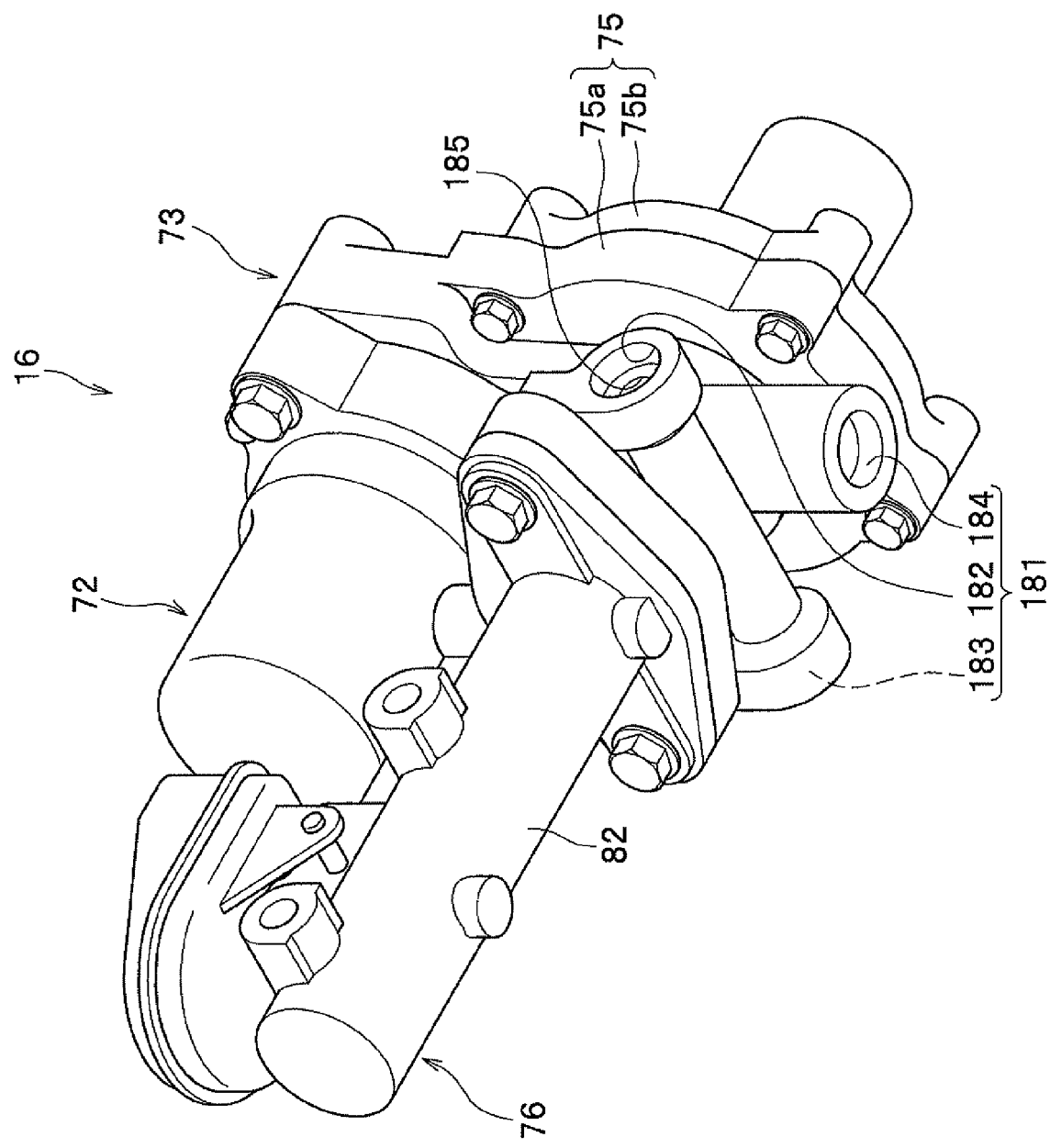
FIG. 18 is a perspective view seen obliquely from below of the motor cylinder device.

FIG. 18 is a perspective view seen obliquely from below of the motor cylinder device. As shown in FIG. 18, the motor cylinder device 16 is provided with a mounting portion 181 for mounting the motor cylinder device 16 on a side frame or the like of the vehicle body 1 (see FIG. 13). When viewed from the cover 75b side in the direction of the central axis CL (see FIG. 16), the mounting portion 181 includes a left mounting hole 182 located on the left side, a right mounting hole 183 located on the right side, and a lower mounting hole 184 located on the lower side. Each of the mounting holes 182 to 184 on the left, right, and lower side respectively exhibits a cylindrical recess portion capable of being attached with a rubber bush (not shown) for a floating support. Further, the mounting portion 181 has a through hole 185, which is formed along a common axis of the left mounting hole 182 and the right mounting hole 183 and has an axis orthogonal to the central axis CL (see FIG. 16).

The mounting portion 181 is provided in the vicinity of the center of gravity of the motor cylinder device 16. Here, the mounting portion 181 is provided on the case 75a of the driving force transmission unit 73. According to such a configuration, it is possible to support the vicinity of the center of gravity of the motor cylinder device 16, thereby reducing shake even when subjected to forces such as vibration.

Then, the motor cylinder device 16 is mounted on the side frame or the like of the vehicle body 1 (see FIG. 13) via the mounting bracket (not shown) by the mounting portion 181. Here, the left mounting hole 182 and the right mounting hole 183 are configured to fastened to the vehicle body side by one bolt to be inserted into the through hole 185, and the mounting work of the motor cylinder device 16 becomes easily. By using this mounting portion 181, it is possible to mount the motor cylinder device 16 on the vehicle body side by supporting three points on the left, right, and lower sides of the motor cylinder device 16.

Figure 19:
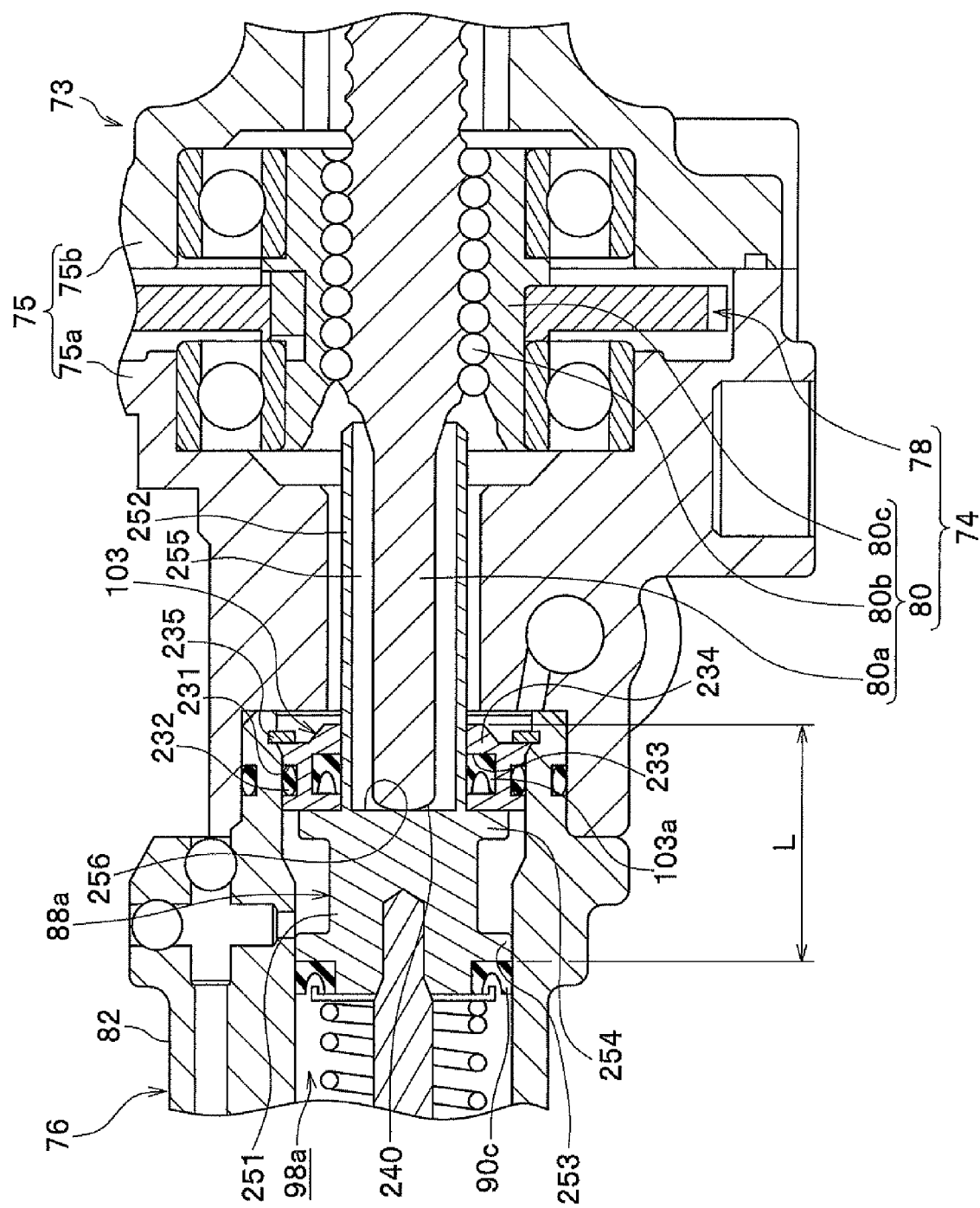
FIG. 19 is an enlarged cross-sectional view around a piston guide.

Next, the guide structure of the second slave piston 88a by the piston guide 103 will be described with reference to FIG. 19. FIG. 19 is an enlarged cross-sectional view around the piston guide.

As shown in FIG. 19, the second slave piston 88a is provided with a substantially columnar main body portion 251 and a substantially cylindrical projecting portion (rod portion) connected to the rear of the main body portion 251. The main body portion 251 of the second slave piston 88a is formed with an annular step portion 253 on the outer peripheral surface of the front end side thereof, and the annular step portion 253 is attached with the slave cup seal 90c at the front side corner portion thereof.

Meanwhile, the main body portion 251 of the second slave piston 88a is formed with an annular axial direction restriction portion (restriction portion) 254 for restricting the backward movement of the second slave piston 88a by abutting against the piston guide 103 at the rear end side thereof. With this configuration, it is possible to assemble the second slave piston 88a into the cylinder portion 76 while restricting the displacement of the second slave piston 88a by the piston guide 103, thereby improving assembling property of the second slave piston 88a. Incidentally, the piston guide 103 is restricted from the backward movement by abutting against a circlip 235 mounted on an inner surface of the rear end side of the cylinder body 82.

Further, a bottom surface (here, corresponds to a rear end surface of the main body portion 251) of a bottomed hole (through hole) 255, which is formed in a projecting portion 252 of the second slave piston 88a and opens rearward, is formed as an abutting surface 256 against the ball screw shaft 80a.

The annular piston guide 103 is disposed so as to face the outer peripheral surface of the projecting portion 252 of the second slave piston 88a. As described above, the piston guide 103 is adapted to guide the second slave piston 88a movably in the axial direction, while sealing liquid-tightly the gap between the driving force transmission mechanism 74 and the outer peripheral surface of the second slave piston 88a.

The piston guide 103 is formed with an annular groove 231 on the outer peripheral surface thereof, and an O-ring 232 as a seal member is attached to the annular groove 231. Further, the piston guide 103 is formed with an annular groove 233 on the inner peripheral surface thereof, and a cup seal 103a as a seal member of cup-shaped cross section is attached to the annular groove 233.

The cup seal 103a and the O-ring 232 are positioned behind the axial direction restriction portion 254. If the axial direction restriction portion 254 is placed behind the cup seal 103a and the O-ring 232, the total length of the second slave piston 88a is extended by the presence of the axial direction restriction portion 254. However, it is possible to shorten the total length of the second slave piston 88a, because the axial direction restriction portion 254 is configured not to be necessary to be placed behind the cup seal 103a and the O-ring 232.

The piston guide 103 is formed with a radial direction restriction portion 234 for restricting the displacement in the radial direction of the second slave piston 88a at the rear end side thereof. The radial direction restriction portion 234 is disposed on the outer peripheral surface of the second slave piston 88a, and is positioned behind the abutting surface 256 in the axial direction.

By restricting the displacement in the radial direction of the second slave piston 88a behind the abutting surface 256 with the ball screw shaft 80a of the second slave piston 88a in this way, it is possible to suppress an inclination of the second slave piston 88a at the pressing time of the second slave piston 88a by the ball screw shaft 80a. Therefore, it is also possible to suppress uneven abrasion of the contact portion of the second slave piston 88a with the ball screw shaft 80a.

At a backward limit position (stroke end; see FIG. 19) where the axial direction restriction portion 254 abuts against the piston guide 103 and the piston guide 103 abuts against the circlip 235, the second slave piston 88a is formed such that the front end of the main body portion 251 thereof is disposed toward the side of the second hydraulic chamber 98a which is formed in front of the second slave piston 88a, while the rear end of the projecting portion 252 thereof projects into the side of the housing 75 which houses the driving force transmission mechanism 74.

Further, the housing 75 and the cylinder body 82 are formed separately, and the piston guide 103 is accommodated in the cylinder body 82. With this configuration, the handling as the entire cylinder portion 76 including the assembling operation is facilitated, because components disposed in the cylinder body 82 are restricted liquid-tightly so as not to fall off by the piston guide 103.

As described above, in the third embodiment, in the electric brake apparatus for generating the brake hydraulic pressure by driving the first slave piston 88b and the second slave piston 88a in the axial direction by the driving force of the motor 72, the annular piston guide 103, which seals liquid-tightly a gap between the driving force transmission mechanism 74 and the outer peripheral surface of the second slave piston 88a, and guides the second slave piston 88a movably in the axial direction, is disposed so as to face the outer peripheral surface of the second slave piston 88a.

The guide structure of the second slave piston 88a by the piston guide 103 which is configured as described above, works as follows. That is, the nut 80c receives the rotational driving force of the motor 72, and the ball screw shaft 80a engaged with the nut 80c presses the second slave piston 88a by moving forward in the axial direction in a state where the tip end 240 thereof abuts against the abutting surface 256 of the second slave piston 88a, and thereby the second slave piston 88a is driven forward.

At this time, since the second slave piston 88a moves forward in a state where the outer peripheral surface thereof is guided by the annular piston guide 103, a guide position by the radial direction restriction portion 234 of the piston guide 103 on the outer peripheral surface of the second slave piston 88a moves backward relatively on the second slave piston 88a as the second slave piston 88a moves forward. As a result, a supporting length (guide length) L (see FIG. 19), which is a distance between the guide position by the radial direction restriction portion 234 of the piston guide 103 and the front guide position by the annular step portion 253 on the outer peripheral surface of the second slave piston 88a, increases.

Therefore, according to the third embodiment, it is possible to prevent the inclination of the second slave piston 88a more effectively when the second slave piston 88a is driven in the axial direction. Thus, it is possible to suppress abrasion and damage of the second slave piston 88a, the sliding surface of the cylinder body 82 with the second slave piston 88a, the slave cup seal 90c as a seal member attached to the second slave piston 88a, the cup seal 103a, and the like.

Further, in the third embodiment, at the backward limit position of the second slave piston 88a, the rear end thereof is formed so as to project to the housing 75 side, while the front end thereof is disposed toward the second hydraulic chamber 98a side. Therefore, it is possible to prevent the inclination of the second slave piston 88a more reliably by ensuring a long supporting length of the second slave piston 88a, without increasing the size of the second slave piston 88a of the motor cylinder device 16 in the axial direction. It is also possible to suppress the brake fluid in the cylinder portion 76 from entering into the housing 75 side.

In the third embodiment, although the second slave piston 88a is described as an example of a configuration corresponding to a piston described in claims, a configuration including the first slave piston 88b and the second slave piston 88a may be a configuration corresponding to the piston described in claims.

The present invention has been described with reference to the above embodiments, but it is not limited to the configuration described in each embodiment. The configuration can be modified as appropriate without departing from the scope and spirit of the present invention by selecting or combining appropriately the configuration described in each embodiment.

For example, in the above embodiments, the housing 75 and the cylinder body 82 are formed separately from each other, and the piston guide 103 is accommodated in the cylinder body 82, but the present invention is not limited thereto. That is, the cylinder body 82 and at least a portion of the housing 75 (for example, case 75a) may be formed integrally. In addition, the piston guide 103 may be configured to be accommodated in the housing 75.

In the above embodiments, the cylinder portion 76 of a so-called tandem type including a first slave piston 88b and the second slave piston 88a which are disposed in series in the central axis CL direction (see FIG. 16) has been described, but the present invention is not limited thereto. The present invention can be of course applicable to the electric brake device having a cylinder portion including one piston and one hydraulic chamber formed in front of the piston.

REFERENCE SIGNS LIST

10: vehicle brake system
14: input device
16: motor cylinder device (electric brake device)
18: VSA device (vehicle behavior stabilization device)
32FR, 32RL, 32RR, 32FL: wheel cylinder
34: master cylinder (outside)
72: electric motor (motor)
73: driving force transmission unit
74: actuator mechanism (driving force transmission mechanism)
75: actuator housing (housing)
76: cylinder mechanism (cylinder, cylinder portion)
80: ball screw structure
80a: ball screw shaft
80c: nut (nut member)
82: cylinder body
83: inner peripheral wall (piston sliding surface)
84: second reservoir (pressing member)
88a: second slave piston (piston)
88b: first slave piston (piston)
96a: second spring (elastic member)
96b: first spring (elastic member)
98a: second hydraulic chamber (hydraulic chamber)
98b: first hydraulic chamber (output hydraulic chamber)
102, 102a, 300, 310, 320: restriction pin (restriction unit)
103: piston guide (guide portion)
103a: cup seal (seal member)
200a: flange portion
201: rear surface
202a, 202b: groove portion (reduced diameter portion)
204: clearance
206: restriction portion (abutting portion)
212: recess portion (reduced diameter portion)
214: annular tapered surface (enlarged diameter portion)
232: O-ring (seal member)
254: axial direction restriction portion (restriction portion)

The invention claimed is:

1. An electric brake device, comprising:
an output hydraulic pressure chamber connected to a wheel cylinder;
a piston that generates a hydraulic pressure in the output hydraulic pressure chamber by moving forward;
a cylinder that accommodates the piston in a cylinder body;
a motor that drives the piston forward by transmitting a driving force thereof to the piston; and a restriction unit that restricts a backward movement of the piston when a hydraulic pressure is applied from an outside to the output hydraulic pressure chamber,
wherein the restriction unit is composed of a restriction pin that is inserted and secured to the cylinder body in a direction perpendicular to an axial direction of the cylinder,
wherein a tapered clearance is formed between an inner peripheral wall of the cylinder and an outer surface of the restriction pin,
wherein the restriction pin has a central portion, having a first diameter, disposed centrally within the cylinder, first and second reduced diameter portions, having a reduced diameter smaller than the first diameter, adjacent to the central portion and disposed adjacent to the inner peripheral wall of the cylinder, and first and second ends, having the first diameter, respectively disposed adjacent to the first and second reduced diameter portions, and
wherein the clearance is formed between the reduced diameter portion and the inner peripheral wall of the cylinder.

2. The electric brake device as set forth in claim 1, wherein the restriction pin is inserted and secured to the cylinder body.

3. The electric brake device as set forth in claim 1, wherein an axial length of a support portion of the restriction pin supported by the cylinder body is set longer than an axial length of the clearance in an insertion direction of the restriction pin.

4. The electric brake device as set forth in claim 1, wherein the cylinder body which supports the restriction pin is partially formed with an enlarged diameter portion of the inner peripheral wall thereof, and the clearance is formed between the enlarged diameter portion and the outer surface of the restriction pin.

5. The electric brake device as set forth in claim 1, wherein shapes of a first end side of the restriction pin and a second end side of the restriction pin opposite the first end side in the axial direction of the restriction pin are formed symmetrically.

6. The electric brake device as set forth in claim 1, further comprising a restriction portion that restricts an abutment between the piston and the central portion of the restriction pin.

7. The electric brake device as set forth in claim 1, further comprising a holding member that holds a head portion of the restriction pin.

8. The electric brake device as set forth in claim 1, wherein the piston is partially formed with an abutting portion against the restriction pin on an outer peripheral side thereof.

9. The electric brake device as set forth in claim 8, wherein the abutting portion is formed on a rear surface of a flange portion supporting an elastic member which urges the piston toward a backward direction.

10. The electric brake device as set forth in claim 9, wherein the abutting portion is composed of a groove portion formed on the rear surface of the flange portion in a direction perpendicular to an axial direction of the piston.

11. The electric brake device as set forth in claim 1, further comprising a driving force transmission mechanism for transmitting the driving force of the motor to the piston, wherein
an annular guide portion that guides the piston movably in the axial direction of the piston is disposed so as to face the outer peripheral surface of the piston.

12. The electric brake device as set forth in claim 11, wherein the piston is partially formed with a restriction portion that restricts a movement of the piston to the driving force transmission mechanism side by an abutment thereof against the guide portion, and a seal member disposed in the guide portion is positioned on the driving force transmission mechanism side of the restriction portion.

13. The electric brake device as set forth in claim 11, wherein the piston is, at a movement limit position of the piston to the driving force transmission mechanism side, formed such that one end thereof is disposed toward the hydraulic chamber side formed on the opposite side to the driving force transmission mechanism of the piston, and the other end thereof is formed so as to project to a housing side that accommodates the driving force transmission mechanism.

14. The electric brake device as set forth in claim 11, wherein
the cylinder includes the cylinder body in which the piston is disposed slidably, and
the cylinder body and the housing accommodating the driving force transmission mechanism are formed separately, while the guide portion is accommodated in the cylinder body.

15. The electric brake device as set forth in claim 1, wherein:
an engaging hole extends into the cylinder body from the inner peripheral wall with an opening portion of the engaging hole provided at the inner peripheral wall, and
the restriction pin is inserted into the engaging hole with the tapered clearance provided at the opening portion.

* * * * *